US012715353B2

(12) United States Patent
Van Wiemeersch et al.

(10) Patent No.: US 12,715,353 B2
(45) **Date of Patent: *Aug. 25, 2026**

(54) METHOD OF CONTROLLING A VEHICLE HAVING A LOAD RAMP

(71) Applicant: Ford Global Technologies, LLC, Dearborn, MI (US)

(72) Inventors: John Robert Van Wiemeersch, Novi, MI (US); Stuart C. Salter, White Lake, MI (US); David Brian Glickman, Southfield, MI (US); Peter Phung, Windsor (CA); Paul Kenneth Dellock, Northville, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/915,542

(22) Filed: Oct. 15, 2024

(65) Prior Publication Data

US 2025/0033549 A1 Jan. 30, 2025

Related U.S. Application Data

(63) Continuation of application No. 17/901,030, filed on Sep. 1, 2022, now Pat. No. 12,145,492.

(51) Int. Cl.

*B60P 1/43* (2006.01)
*B60J 5/10* (2006.01)

(Continued)

(52) U.S. Cl.

CPC ............... *B60P 1/435* (2013.01); *B60J 5/102* (2013.01); *E05F 15/60* (2015.01); *G06V 20/56* (2022.01);

(Continued)

(58) Field of Classification Search

CPC .. B60P 1/435; B60P 1/431; B60J 5/102; B60J 5/103; B60R 3/00; E05F 15/60;

(Continued)

(56) References Cited

U.S. PATENT DOCUMENTS 5,832,555 A 11/1998 Saucier et al.
6,179,545 B1 1/2001 Petersen, Jr. et al.

(Continued)

FOREIGN PATENT DOCUMENTS

JP 5081661 B2 11/2012
JP 2020047174 A 3/2020

*Primary Examiner* — Aniss Chad
*Assistant Examiner* — Christine Nguyen Huynh
(74) *Attorney, Agent, or Firm* — Vichit Chea; Price Heneveld LLP

(57) ABSTRACT

A vehicle includes a body, an access aperture that is defined by the body, a closure panel, a load ramp, and a moisture sensor. The access aperture provides access to an interior of the vehicle. The closure panel selectively covers at least a portion of the access aperture. The closure panel is movable between an open position and a closed position relative to the access aperture. The load ramp is deployably coupled to the closure panel. The load ramp includes a coupled end and a free end. The load ramp is movable between a retracted position and an extended position. The moisture sensor is positioned proximate to the free end of the load ramp. Methods of controlling the vehicle are also disclosed.

20 Claims, 23 Drawing Sheets

(51) Int. Cl.

| | |
|---|---|
| ***E05F 15/60*** | (2015.01) |
| ***G06V 20/56*** | (2022.01) |
| ***H04R 1/08*** | (2006.01) |
| ***H04R 3/00*** | (2006.01) |

(52) U.S. Cl.
CPC ................. *H04R 1/08* (2013.01); *H04R 3/00* (2013.01); *E05Y 2201/434* (2013.01); *E05Y 2400/40* (2013.01); *E05Y 2400/44* (2013.01); *E05Y 2400/446* (2024.05); *E05Y 2400/447* (2024.05); *E05Y 2400/512* (2013.01); *E05Y 2800/122* (2013.01); *E05Y 2800/242* (2013.01); *E05Y 2900/546* (2013.01); *H04R 2499/13* (2013.01)

(58) Field of Classification Search
CPC .. E05F 15/611; E05F 15/71; E05Y 2201/434; E05Y 2400/40; E05Y 2400/44; E05Y 2400/446; E05Y 2400/447; E05Y 2400/512; E05Y 2800/122; E05Y 2800/242; E05Y 2900/546; E05Y 2800/102; E05Y 2800/104; E05Y 2800/244; G06V 20/56; H04R 1/08; H04R 3/00; H04R 2499/13
See application file for complete search history.

(56) References Cited

U.S. PATENT DOCUMENTS

| | | | | |
|---|---|---|---|---|
| 9,271,883 | B2 | 3/2016 | Johnson et al. | |
| 9,670,013 | B2 | 6/2017 | Parrish | |
| 10,919,428 | B2 | 2/2021 | Wallace et al. | |
| 2001/0042989 | A1* | 11/2001 | Greif | E05F 15/40 296/50 |
| 2018/0257537 | A1* | 9/2018 | DeSimone | B62D 33/0273 |
| 2019/0323278 | A1* | 10/2019 | Ghannam | G07C 9/29 |
| 2019/0382224 | A1 | 12/2019 | Vollmar et al. | |
| 2020/0115949 | A1* | 4/2020 | Jager | B60J 7/0573 |
| 2021/0345043 | A1* | 11/2021 | Trestain | H04R 3/02 |
| 2022/0305977 | A1* | 9/2022 | Oya | E05F 15/73 |

* cited by examiner

METHOD OF CONTROLLING A VEHICLE HAVING A LOAD RAMP

CROSS-REFERENCE TO RELATED APPLICATION

This application is a continuation of U.S. application Ser. No. 17/901,030, filed on Sep. 1, 2022, now U.S. Pat. No. 12,145,492 B2, entitled "LOAD RAMP FOR A VEHICLE," the disclosure of which is hereby incorporated by reference in its entirety.

FIELD OF THE DISCLOSURE

The present disclosure generally relates to load ramps. More specifically, the present disclosure relates to load ramps for vehicles.

BACKGROUND OF THE INVENTION

Consumers often compare available features and functionality between vehicles when making a purchasing decision. Accordingly, additional solutions are needed that provide features and functionality that are desirable to consumers.

SUMMARY OF THE INVENTION

According to a first aspect of the present disclosure, a vehicle includes a body, an access aperture that is defined by the body, a closure panel, a load ramp, and a moisture sensor. The access aperture provides access to an interior of the vehicle. The closure panel selectively covers at least a portion of the access aperture. The closure panel is movable between an open position and a closed position relative to the access aperture. The load ramp is deployably coupled to the closure panel. The load ramp includes a coupled end and a free end. The load ramp is movable between a retracted position and an extended position. The moisture sensor is positioned proximate to the free end of the load ramp.

Embodiments of the first aspect of the disclosure can include any one or a combination of the following features:

- a heating element positioned proximate to the free end of the load ramp;
- a controller that monitors a local weather report and current ambient weather conditions to inform deployment of the load ramp;
- if the controller determines that precipitation is forecast in the local weather report or if the controller determines that the current ambient weather conditions will decrease from an above-freezing temperature to a below-freezing temperature, then the controller prevents deployment of the load ramp;
- a motor that actuates the closure panel between the open position and the closed position;
- a controller that monitors a current of the motor relative to a predetermined current threshold, wherein if the current of the motor exceeds the predetermined current threshold, then the load ramp is determined to be in the extended position;
- a microphone and a controller that processes sound detected by the microphone, wherein the controller monitors a position of the closure panel and a speed of the vehicle, and wherein, if the controller determines that the closure panel is in the open position, the vehicle is in motion, and a scraping sound that is detected by the microphone correlates proportionally with the speed of the vehicle, then the controller indicates to a user that the load ramp is in the extended position and that the load ramp should be placed in the retracted position;
- the closure panel includes a free edge, wherein the closure panel defines a cavity therein, wherein the free edge defines an opening of the cavity defined by the closure panel, and wherein the load ramp is stored within the cavity of the closure panel when the load ramp is in the retracted position; and
- a controller that prevents vehicle motion when the load ramp is in the extended position and a transmission is placed in a position that corresponds with traveling in reverse.

According to a second aspect of the present disclosure, a method of controlling a vehicle includes determining that a load ramp is in an extended position; and determining that a cargo item is not extending out of an access aperture of the vehicle. The access aperture is proximate to the load ramp.

Embodiments of the second aspect of the present disclosure can include any one or a combination of the following features:

- the step of determining that a load ramp is in an extended position includes monitoring a current of a motor that actuates a closure panel between an open position and a closed position, wherein the closure panel selectively covers at least a portion of the access aperture, and wherein the load ramp is deployably coupled to the closure panel; activating the motor to actuate the closure panel to the closed position; and determining that the load ramp is in the extended position when the current of the motor exceeds a predetermined current threshold;
- determining that a speed of the vehicle is greater than zero;
- the step of determining that a load ramp is in an extended position includes processing sound that is detected by a microphone, wherein the microphone is attached to the vehicle; and determining that the load ramp is in the extended position when a scraping sound is detected by the microphone;
- the scraping sound that is detected by the microphone correlates proportionally with the speed of the vehicle;
- the step of determining that a load ramp is in an extended position includes sensing a current position of a tag that is coupled to the load ramp relative to a vehicle receiver; and determining that the load ramp is in the extended position when a distance between the tag and the vehicle receiver exceeds a predetermined distance threshold;
- preventing movement of the vehicle when the load ramp is in the extended position and a transmission is placed in a position that corresponds with traveling in reverse; and activating a ramp motor that actuates the load ramp between the extended position and a retracted position such that the load ramp is actuated toward the retracted position;
- the step of determining that a cargo item is not extending out of an access aperture of the vehicle includes referencing an image captured by a vehicle-mounted camera, wherein the vehicle-mounted camera is coupled to the vehicle such that a field-of-view of the camera includes the access aperture;
- the vehicle-mounted camera is coupled to a roof of the vehicle;
- determining that the vehicle is traveling in reverse; and actuating the load ramp to a retracted position; and monitoring a local weather report and current ambient weather conditions exterior to the vehicle; and actuating the load ramp to a retracted position when at least one of the local weather report and the current ambient weather conditions exterior to the vehicle indicate a forecast for a local temperature to decrease from an above-freezing temperature to a below-freezing temperature.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
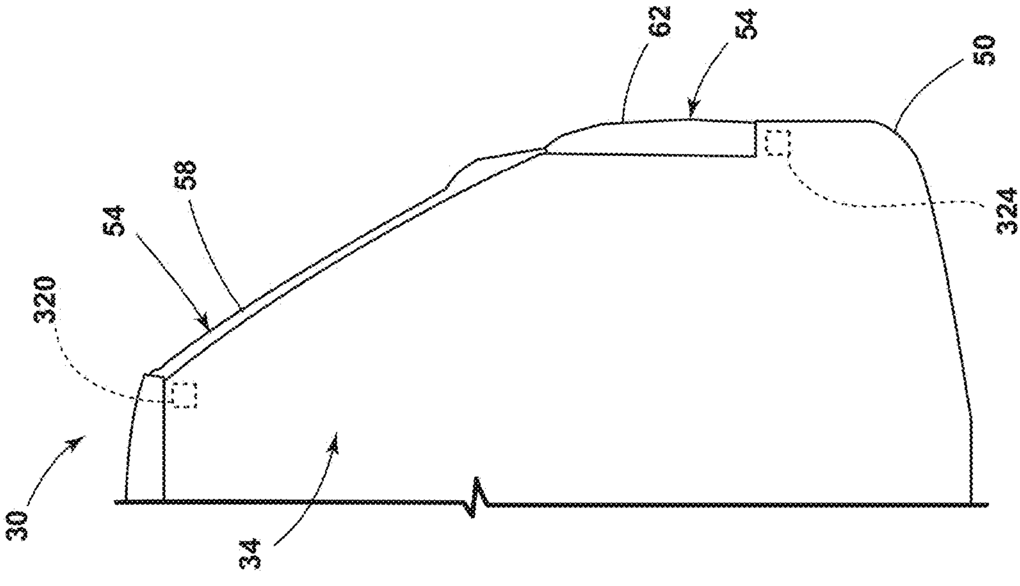
FIG. 1 is a side view of a rear of a vehicle, illustrating an upper closure panel and a lower closure panel each in a closed position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a load ramp for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-23, reference numeral 30 generally designates a vehicle. The vehicle 30 includes a body 34 that defines an access aperture 38. In various examples, the access aperture 38 can provide access to an interior of the vehicle 30 (e.g., a passenger compartment 42 and/or a cargo area 46 of the vehicle 30). For example, the access aperture 38 may be located at a rear 50 of the vehicle 30. The access aperture 38 can be selectively covered by one or more closure panels 54. For example, an upper closure panel 58 and/or a lower closure panel 62 may be employed. The upper closure panel 58, when employed, is operable between a closed position (see FIG. 1) and an open position (see FIG. 2). Similarly, the lower closure panel 62, when employed, is operable between a closed position (see FIG. 1) and an open position (see FIG. 2). The lower closure panel 62 can be provided with a load ramp 66 and/or the lower closure panel 62 can be configured to receive the load ramp 66. In various examples, the load ramp 66 can be provided with one or more moisture sensors 68.

Referring again to FIGS. 1-23, in various examples, the load ramp 66 can include a corrugated layer 70 that has a first surface 74 and a second surface 78. A first layer 82 can be positioned adjacent to the first surface 74 of the corrugated layer 70. A second layer 86 can be positioned adjacent to the second surface 78 of the corrugated layer 70 such that the corrugated layer 70 is positioned between the first and second layers 82, 86. A thickness 90 of the load ramp 66 can be in the range of about 10 mm to about 30 mm. For example, the thickness 90 of the load ramp 66 can be about 10 mm, about 15 mm, about 20 mm, about 25 mm, about 30 mm, and/or combinations or ranges thereof. A load capacity of the load ramp 66 may be at least about 100 kg. For example, the load capacity of the load ramp 66 may be at least about 100 kg, at least about 110 kg, at least about 120 kg, at least about 130 kg, at least about 140 kg, at least about 150 kg, and/or combinations or ranges thereof.

Figure 2:
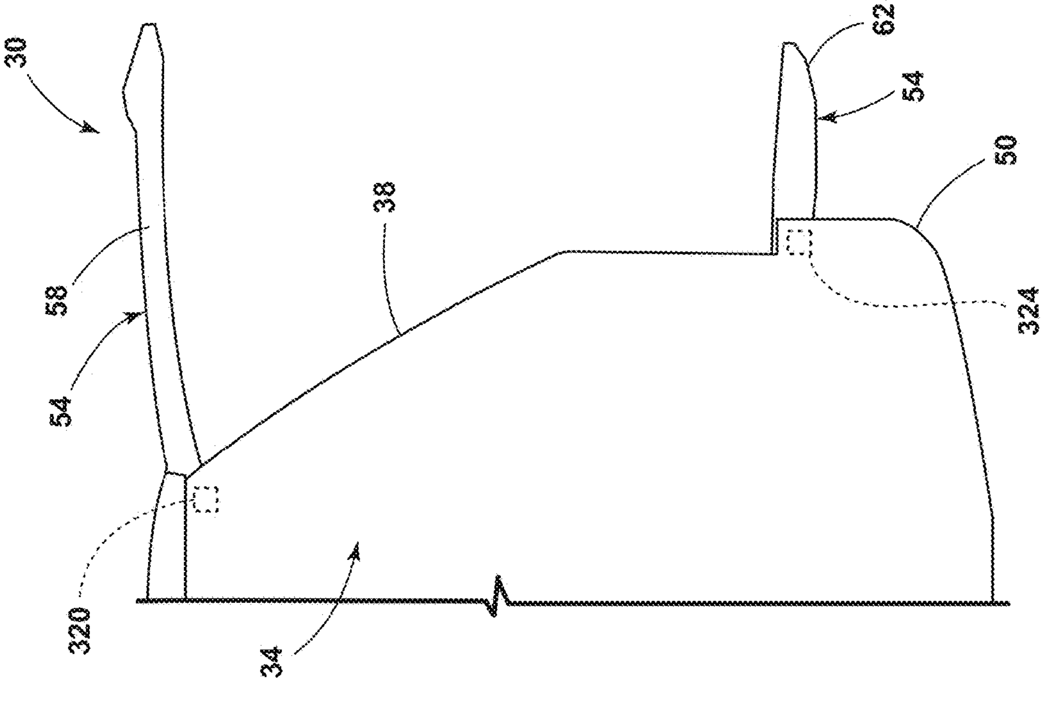
FIG. 2 is a side view of the rear of the vehicle, illustrating the upper closure panel and the lower closure panel each in an open position, according to one example.

Referring to FIGS. 1-2, the vehicle 30 may be an animal-drawn (e.g., horse-drawn) vehicle, various types of equipment (e.g., farm equipment), and/or a motor vehicle. For example, the vehicle 30 may be a land-based vehicle (e.g., an automobile, a motorcycle, a train, a horse-drawn carriage, a tractor, etc.), an air-based vehicle (e.g., an airplane, a helicopter, etc.), and/or a water-based vehicle (e.g., a boat or other watercraft). While the vehicle 30 may be a motor vehicle, the present disclosure is not limited to internal combustion engines as a source of locomotive power for the vehicle 30. Rather, alternative sources may be utilized in providing locomotive power to the vehicle 30. For example, locomotive power may be provided to the vehicle 30 by electric motors, fuel cells, and/or petroleum-based fuel engines. According to various examples, the vehicle 30 may be driver-controlled, semi-autonomous, fully-autonomous, or any combination of user-controlled and automated. For example, the semi-autonomous example of the vehicle 30 may perform many or all-commuting functions (e.g., accelerating, braking, turning, signaling, etc.) independent of user interaction while the user maintains override control of the vehicle 30. It is contemplated that animal-drawn (e.g., horse-drawn) vehicles and/or various types of equipment (e.g., farm equipment) may benefit from the concepts disclosed herein.

Referring again to FIGS. 1-2, the upper closure panel 58 and the lower closure panel 62 can each cover at least a portion of the access aperture 38 when in the closed position. In some examples, when the upper and lower closure panels 58, 62 are both in the closed position, an entirety of the access aperture 38 of the vehicle 30 can be covered. For example, the upper and lower closure panels 58, 62 may each cover about 50% of the access aperture 38 such that the entirety of the access aperture 38 is covered when the upper and lower closure panels 58, 62 are each in the closed position. Accordingly, in such an example, the lower closure panel 62 may cover the lower half of the access aperture 38 while the upper closure panel 58 covers an upper half of the access aperture 38. However, the present disclosure is not so limited. Rather, the upper and lower closure panels 58, 62 may be sized and/or dimensioned in any manner that provides a covering of the entirety of the access aperture 38. For example, expressing the coverage of the upper and lower closure panels 58, 62 of the access aperture 38 as a ratio of upper closure panel 58 coverage to lower closure panel 62 coverage (upper closure panel coverage: lower closure panel coverage), the upper closure panel 58 and the lower closure panel 62 may have a ratio split of the access aperture 38 of about 95:5, about 90:10, about 85:15, about 80:20, about 75:25, about 70:30, about 65:35, about 60:40, about 55:45, about 50:50, about 45:55, about 40:60, about 35:65, about 30:70, and so on without departing from the concepts disclosed herein. In some examples, the lower closure panel 62 may be sized and/or dimensioned to independently cover an entirety of the access aperture 38 to the exclusion of the upper closure panel 58 (e.g., for a bed of a pickup truck).

Figure 3:
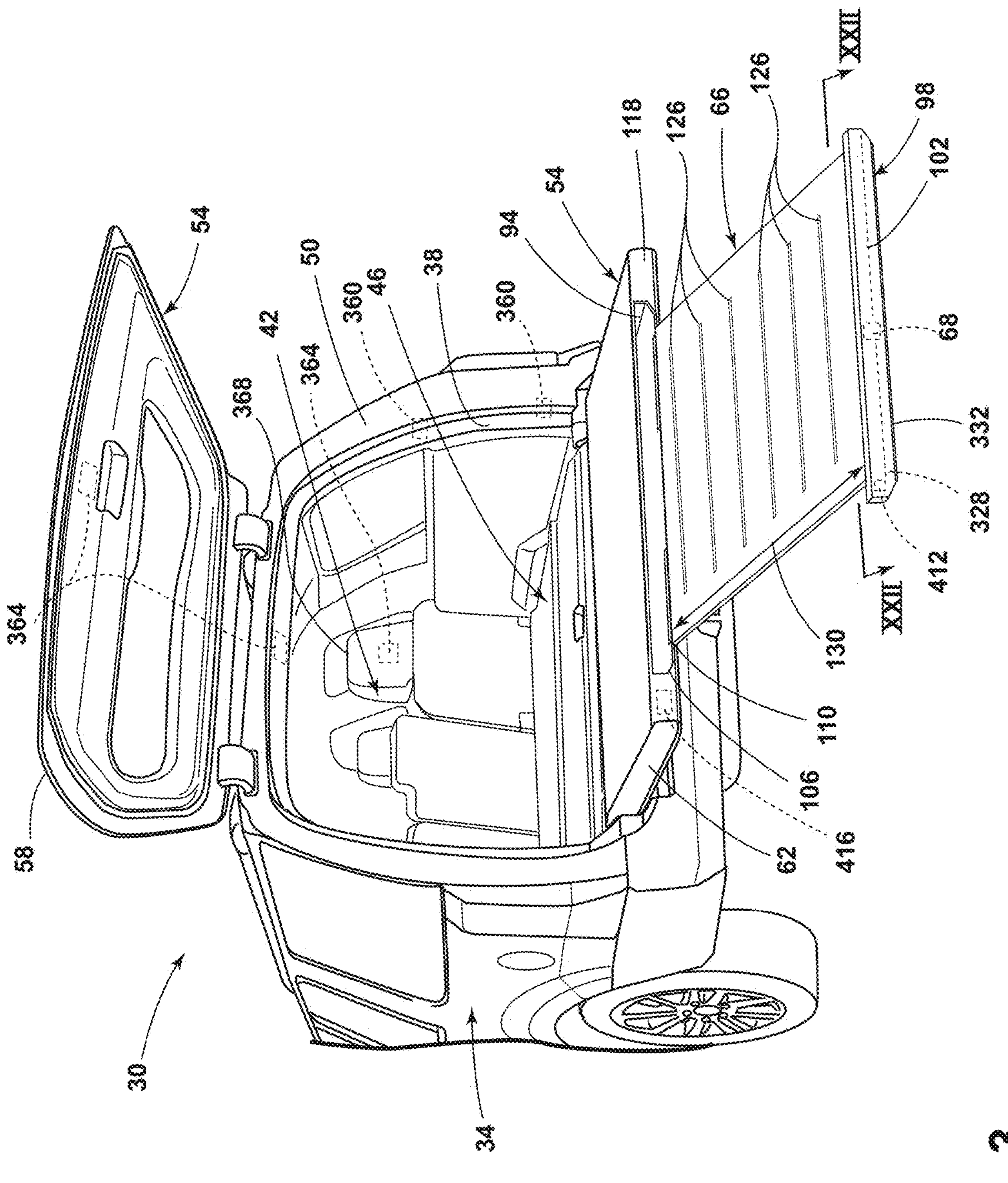
FIG. 3 is a rear perspective view of the vehicle, illustrating a load ramp in an extended position, according to one example.
Figure 4:
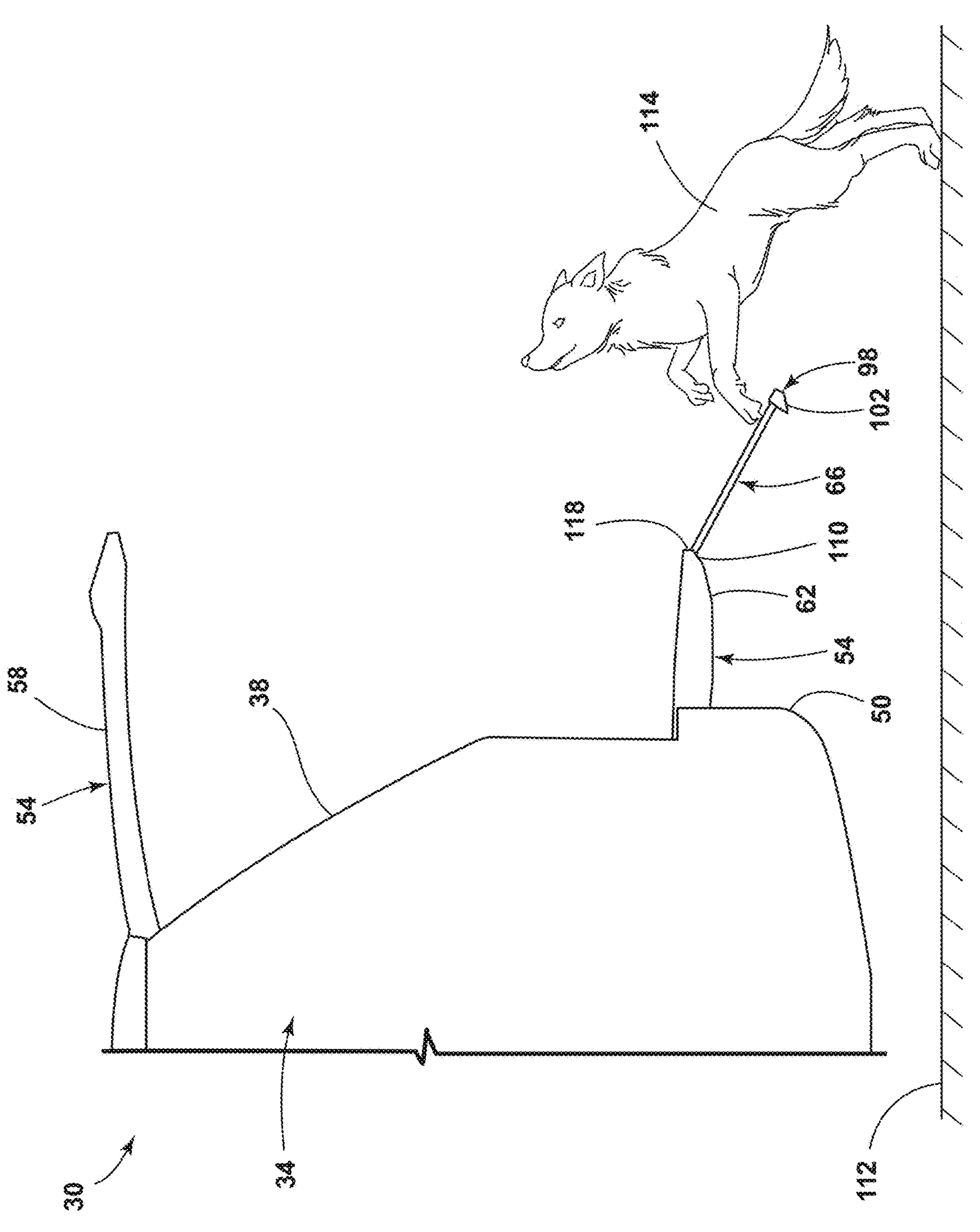
FIG. 4 is a side view of the rear of the vehicle, illustrating a pet utilizing the extended load ramp, according to one example.
Figure 5:
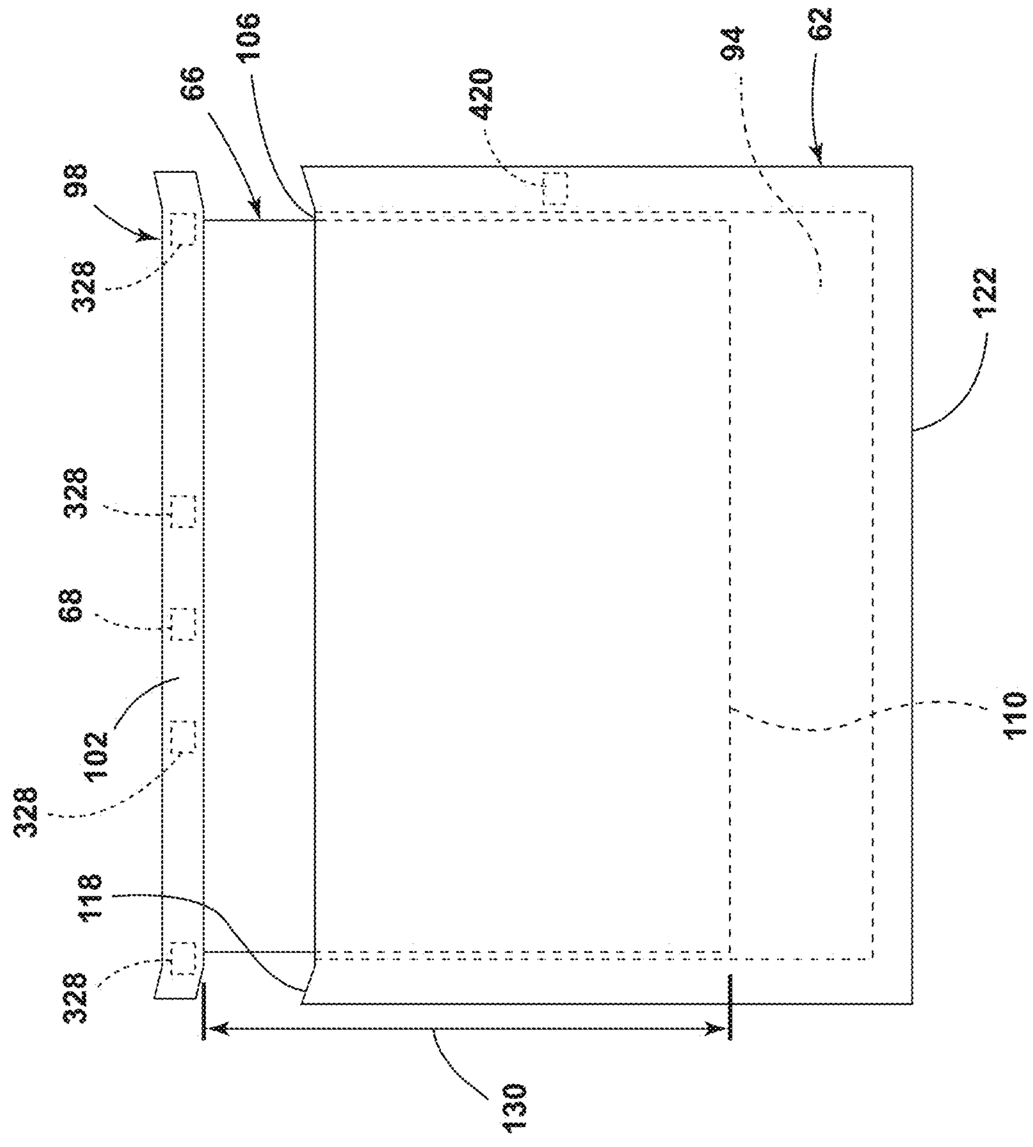
FIG. 5 is a top schematic view of an interaction between the lower closure panel and the load ramp, according to one example.

Referring now to FIGS. 3-5, the lower closure panel 62 can define a cavity 94 therein. The load ramp 66 can be operable between a retracted position and an extended position. The vehicle 30 should remain in a parked state (e.g., transmission in park) any time the load ramp 66 is in the extended position. However, the vehicle 30 may be provided with the capability, as discussed herein, to sense a current position of the load ramp 66 and notify the user of an improper use of the vehicle 30 if the load ramp 30 is extended and the vehicle 30 is placed in motion. When in the retracted position, the load ramp 66 is received within the cavity 94. Transitioning the load ramp 66 from the retracted position to the extended position can be done in a manual or automated fashion. In the depicted example, a free end 98 of the load ramp 66 can include a closeout structure 102 coupled thereto. The closeout structure 102 can be utilized to cover an opening 106 or mouth of the cavity 94, through which the load ramp 66 is moved when actuated between the retracted position and the extended position. In various examples, the moisture sensor 68 can be positioned proximate to the free end 98. In examples that provide the closeout structure 102 as coupled to the free end 98, the moisture sensor 68 may be positioned in the closeout structure 102. In alternative examples, the moisture sensor 68 can be positioned within, or coupled to, the load ramp 66 at a location that is proximate to the free end 98. In general, the moisture sensor 68 can be positioned such that ground-level moisture (e.g., a puddle, snow, ice, etc.) may be sensed by the moisture sensor 68. The ground-level moisture may be sensed by the moisture sensor 68 by way of physical contact with the moisture sensor 68. Additionally, or alternatively, the ground-level moisture may be sensed without physical contact with the moisture sensor 68 (e.g., a proximity-based moisture sensor, a humidity sensor, a capacitive sensor, etc.). The moisture sensor 68 can aid in determining a likelihood that the load ramp 66 (e.g., the free end 98) is wet. In some examples, the moisture sensor 68 may be a strip sensor that extends along a width (e.g., a side-to-side direction) of the load ramp 66. For example, the moisture sensor 68 may have a length that generally corresponds with the width of the load ramp 66, a length that substantially corresponds with the width of the load ramp 66, or a length that corresponds with the width of the load ramp 66.

Referring again to FIGS. 3-5, the free end 98 of the load ramp 66 may be opposite to a coupled end 110 of the load ramp 66. More specifically, the coupled end 110 may remain directly coupled to the lower closure panel 62 in both the retracted position and the extended position. The free end 98 of the load ramp 66 may be a rearward-most portion of the load ramp 66 when the load ramp 66 is in the extended position and the lower closure panel 62 is in the open position. In some examples, the free end 98 of the load ramp 66 may remain suspended above a support surface 112 upon which the vehicle 30 rests when the load ramp 66 is in the extended position (see FIG. 4). In such an example, the load ramp 66 may be placed in the extended position to provide easier access to the passenger compartment 42 and/or the cargo area 46 for a user. In various examples, the user may be a pet 114 and/or the owner of the pet 114.

Referring further to FIGS. 3-5, when in the extended position, the coupled end 110 of the load ramp 66 can protrude from a free edge 118 of the lower closure panel 62. The free edge 118 may be opposite a coupled edge 122 of the lower closure panel 62. The coupled edge 122 of the lower closure panel 62 is adjacent to the passenger compartment 42 and/or the cargo area 46. In various examples, the coupled edge 122 of the lower closure panel 62 can define a pivot axis or rotational axis of the lower closure panel 62 about which the lower closure panel 62 rotates in transitioning between the open position and the closed position. In some examples, the free end 98 of the load ramp 66 may contact the support surface 112 (e.g., the ground) upon which the vehicle 30 rests such that a cargo item may be transitioned from the support surface 112 upon which the vehicle 30 rests to the load ramp 66 with less vertical displacement of the cargo item during the transition from the support surface 112 to the load ramp 66 than is present in examples where the load ramp 66 does not contact the support surface 112. In various examples, a presented surface of the load ramp 66 may be provided with one or more traction members 126 that can be utilized in aiding the pet 114 and/or the cargo item to be loaded into the vehicle 30 in traversing a length 130 of the load ramp 66. The length 130 of the load ramp 66 may include the closeout structure 102.

Referring to FIGS. 6-9, in some examples, the closeout structure 102 that covers the opening 106 of the cavity 94 can be rotatably coupled to the free edge 118 of the lower closure panel 62. For example, the closeout structure 102 can be coupled to the free edge 118 by a hinge 134. In various examples, the load ramp 66 can be provided with a first section 138 and a second section 142. In the depicted example, the first section 138 is received within the second section 142. For example, the second section 142 may define a cavity similar to the cavity 94 of the lower closure panel 62. In such an example, the second section 142 is movable relative to the first section 138. More specifically, the second section 142 may be actuated between a retracted position and an extended position by telescopically sliding the second section 142 relative to the first section 138.

Referring again to FIGS. 6-9, in some examples, the first section 138 can define depressions 146 that can increase a degree of rigidity of the first section 138. Alternatively, the depressions 146 can be utilized as a loading aid for cargo items to be loaded into the vehicle 30. It is contemplated that one or more tabs 148 may be provided upon an interior edge of the second section 142 that engages with the depressions 146 such that the tabs 148 guide actuation of the second section 142 relative to the first section 138 in transitioning between the retracted and extended positions. In such an example, the tabs 148 that engage with the depressions 146 may also prevent the second section 142 from becoming decoupled from the first section 138 by an overextension of the second section 142 relative to the first section 138 when in the extended position. Deployment of the load ramp 66 and/or the second section 142 may be accomplished in a manual manner or a powered manner. In either example, a handle 150 may be defined by the load ramp 66 that a user can utilize to actuate the second section 142 relative to the first section 138 and/or deploy the load ramp 66 from the cavity 94. In some examples, the load ramp 66 may be deployed with a combination of powered and manual actuation. For example, the load ramp 66 may be deployed from the cavity 94 by powered actuation while the second section 142 is extended from the first section 138 by manual actuation. In some examples, the load ramp 66 may be configured such that the free end 98 of the load ramp 66 does not contact the support surface 112 upon which the vehicle 30 rests when the load ramp 66 is in the extended position and the second section 142 is in the deployed position (see FIG. 6). Alternatively, the free end 98 of the load ramp 66 may contact the support surface 112 upon which the vehicle 30 rests when the load ramp 66 is in the extended position.

As discussed above, the vehicle 30 should remain in a parked state (e.g., transmission in park) any time the load ramp 66 is in the extended position. However, the vehicle 30 may be provided with the capability, as discussed herein, to sense a current position of the load ramp 66 and notify the user of an improper use of the vehicle 30 if the load ramp 30 is extended and the vehicle 30 is placed in motion.

Figure 10B:
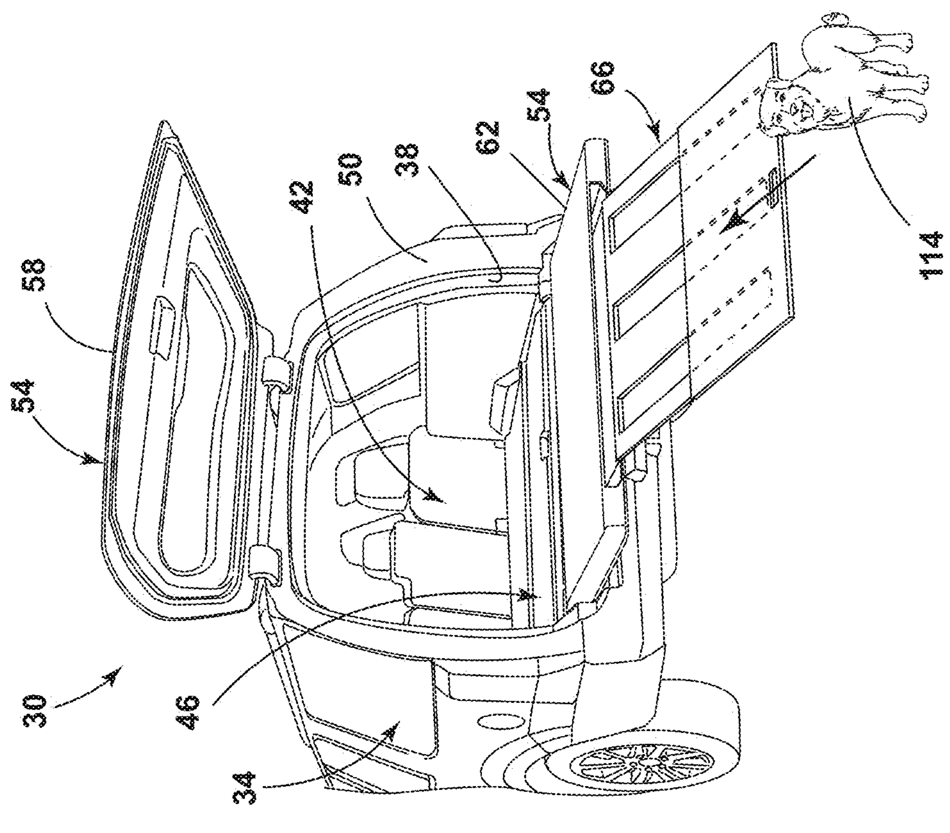
FIG. 10B is a rear perspective view of the vehicle, illustrating the pet on a support surface upon which the vehicle is resting.
Figure 10B:
Figure 10A:
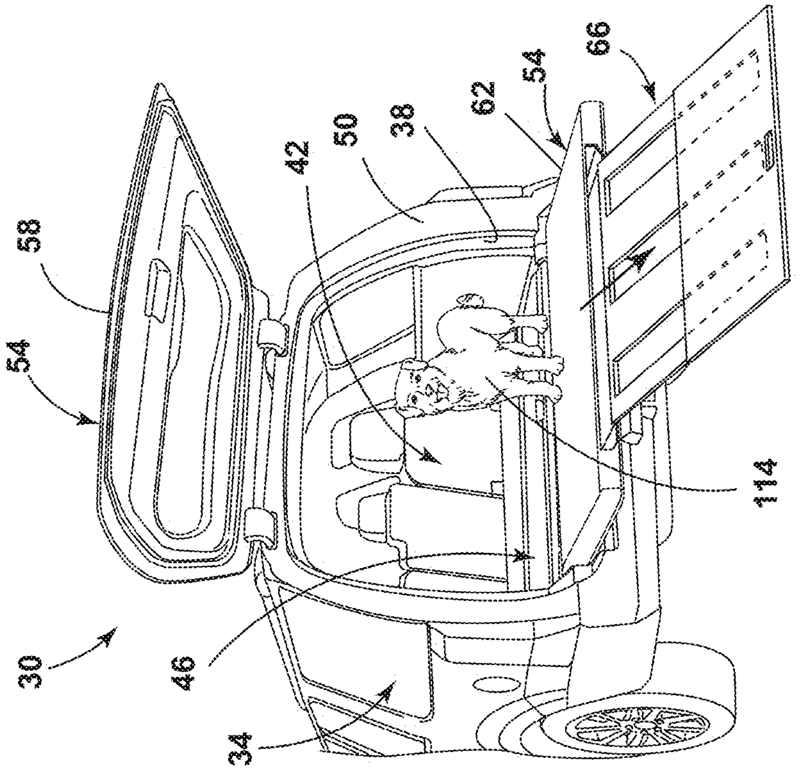
FIG. 10A is a rear perspective view of the vehicle, illustrating the pet within a cargo area of the vehicle.
Figure 11:
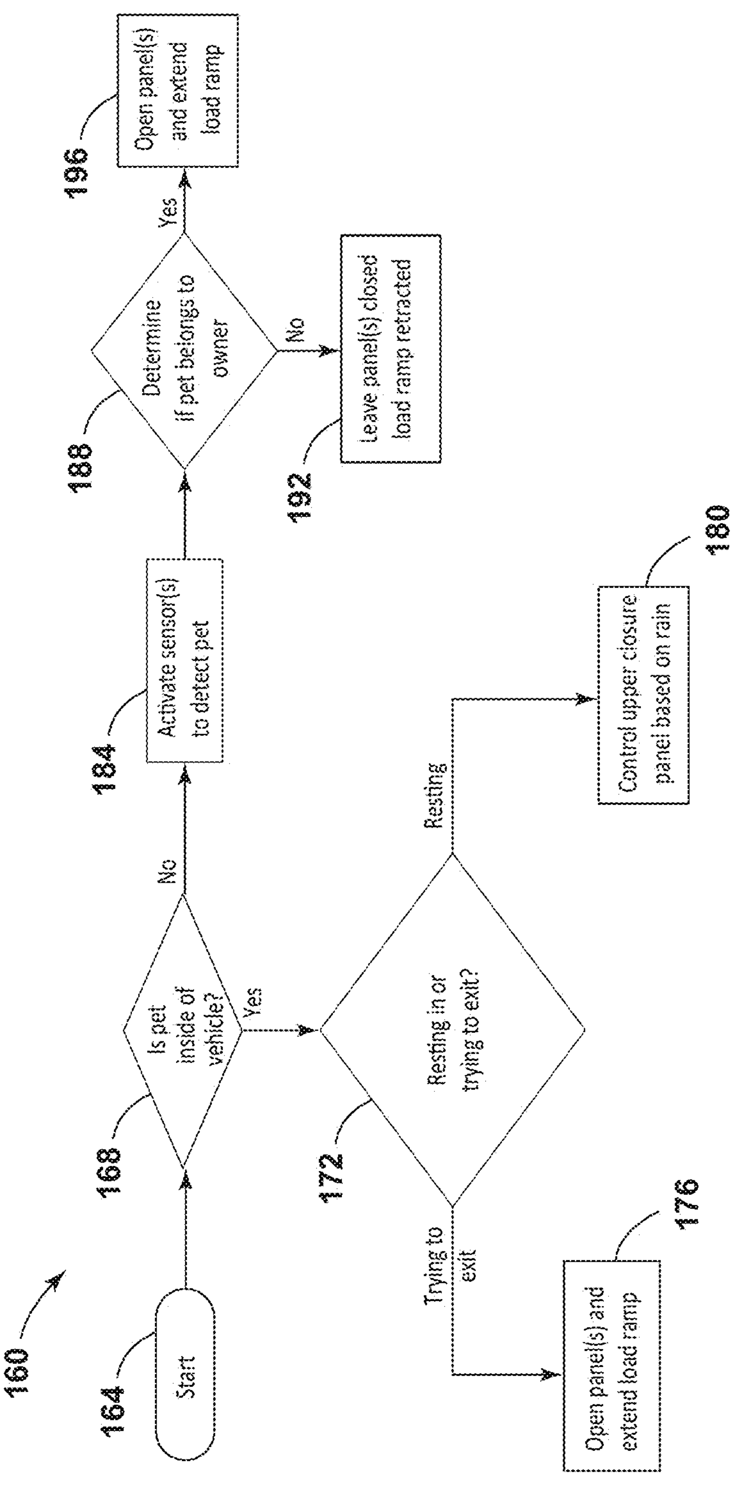
FIG. 11 is a flow diagram illustrating a method of actuating the load ramp, according to one example.
Figure 12:
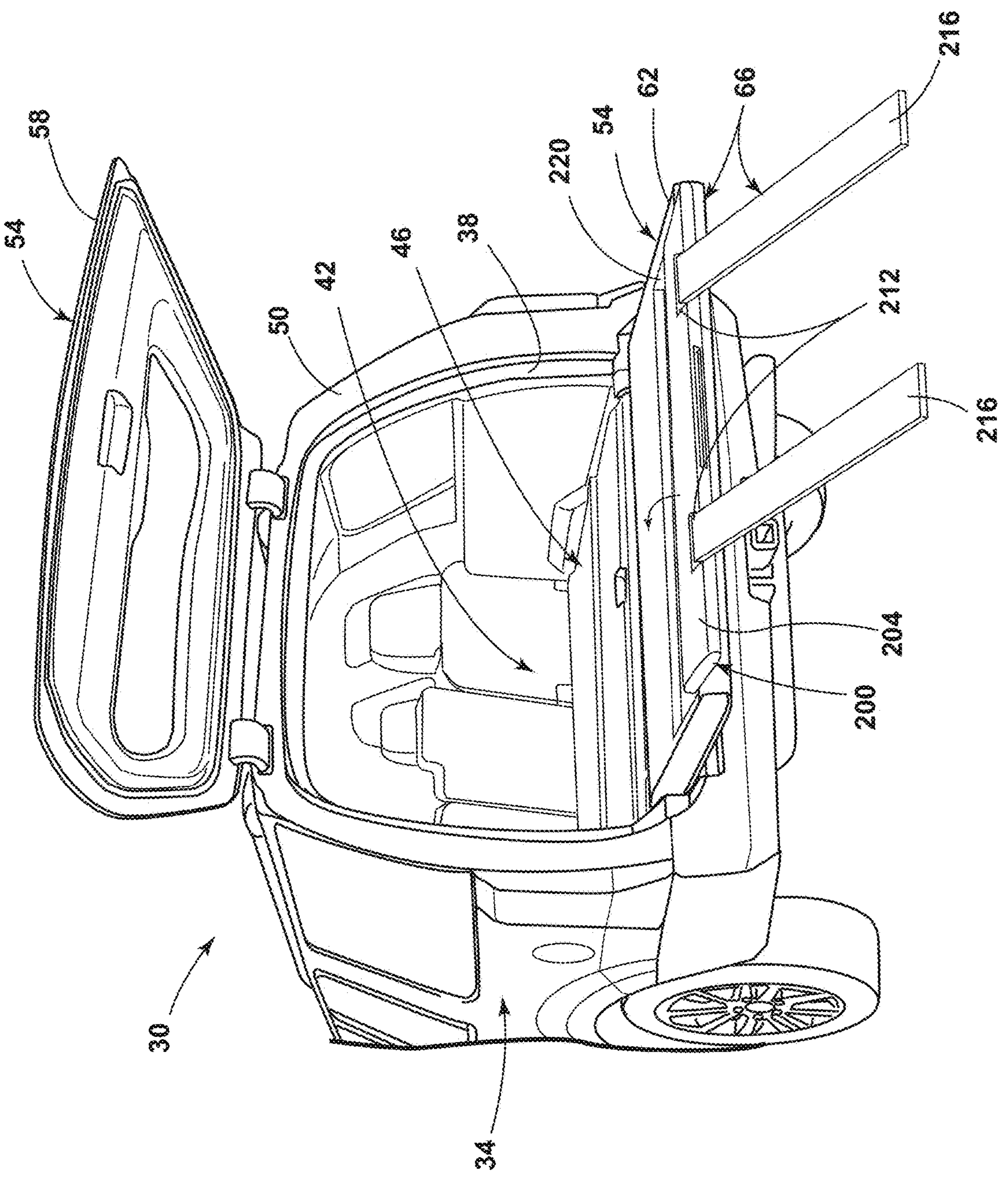
FIG. 12 is a rear perspective view of the vehicle, illustrating an exterior auxiliary panel coupled to the lower closure panel and in a deployed position, according to one example.
Figure 13:
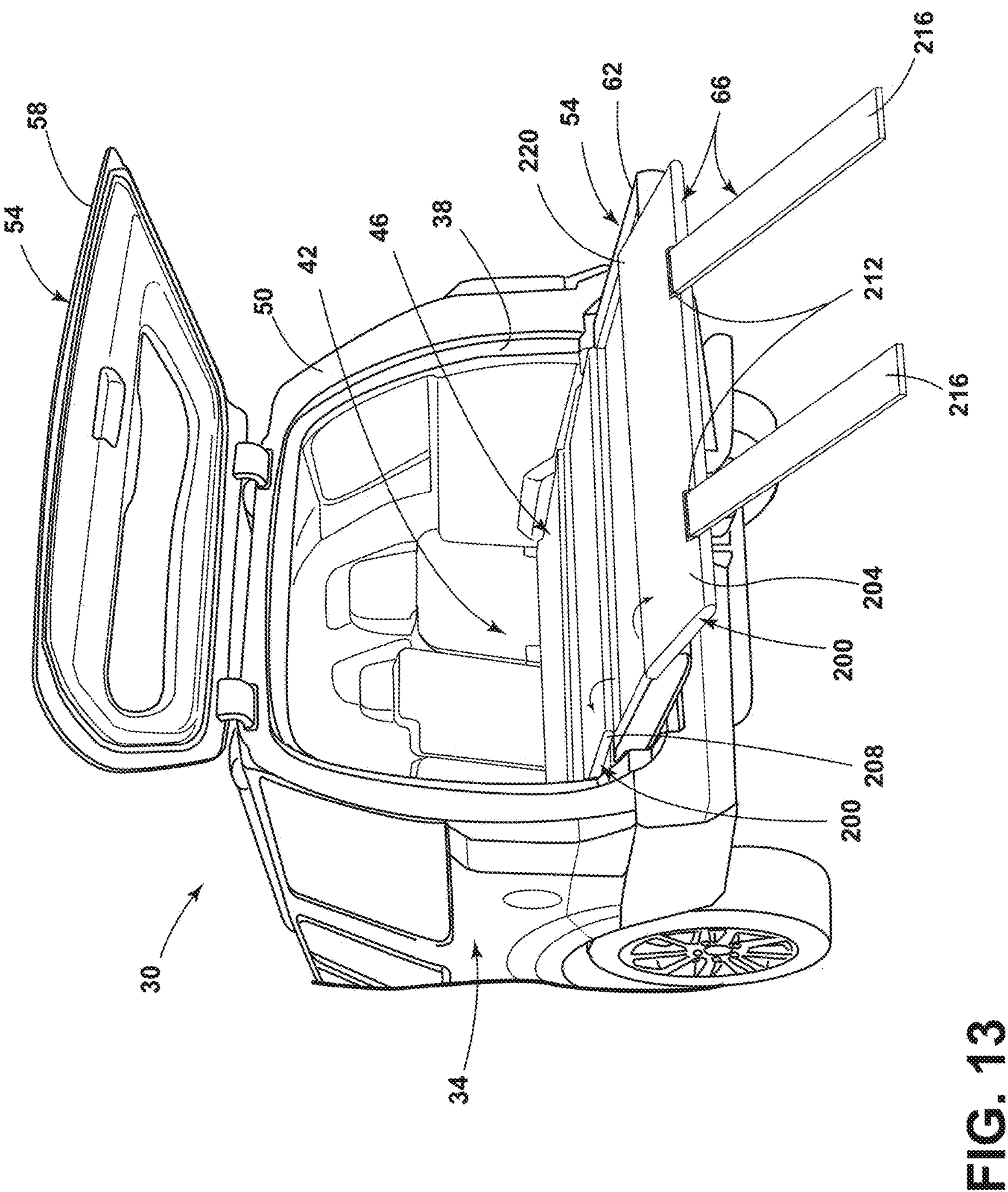
FIG. 13 is a rear perspective view of the vehicle, illustrating the exterior auxiliary panel and an interior auxiliary panel coupled to the lower closure panel and each in a deployed position, according to one example.
Figure 14:
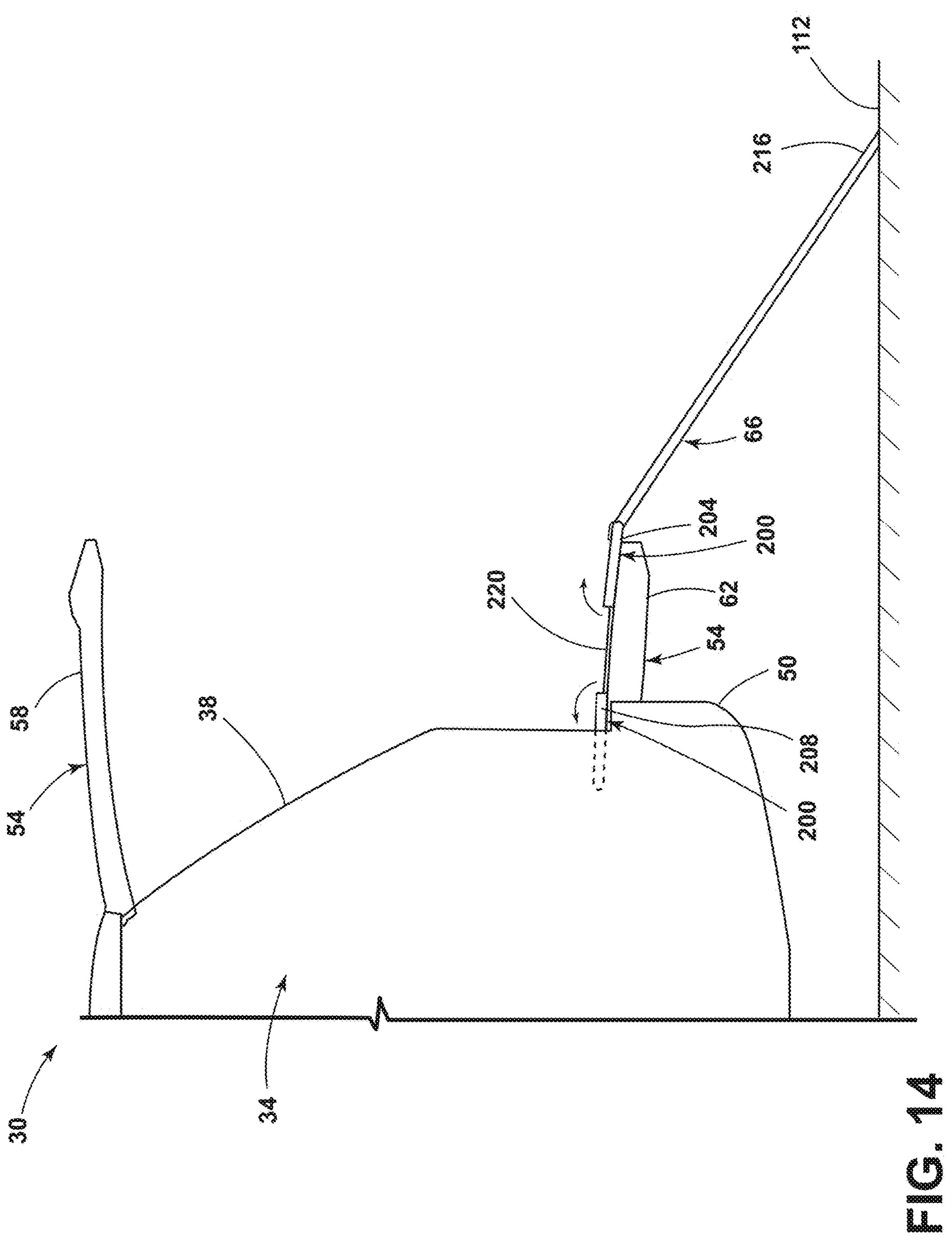
FIG. 14 is a side view of the vehicle, illustrating the exterior auxiliary panel and the interior auxiliary panel coupled to the lower closure panel and each in the deployed position, according to one example.

Referring now to FIGS. 10A-11, an exemplary execution of a method 160 of actuating the load ramp 66 is depicted. The method 160 can begin at starting point 164 and advanced to decision point 168 of determining whether the pet 114 is inside of the vehicle 30. For example, the vehicle 30 may be provided with one or more imagers (e.g., cameras) that are referenced at decision point 168 to determine whether the pet 114 is inside of the vehicle 30. The one or more imagers can be arranged to monitor the cargo area 46 and/or an area that is adjacent and exterior to the rear 50 of the vehicle 30. For example, the one or more imagers can be positioned on an interior surface of one of the closure panels 54, on an exterior surface of one of the closure panels 54, within the cargo area 46, within the passenger compartment 42, and/or any other suitable location that facilitates monitoring the cargo area 46 and/or the area that is adjacent and exterior to the rear 50 of the vehicle 30. If the method 160 determines at decision point 168 that the pet 114 is inside of the vehicle 30, then the method 160 may advance to decision point 172 of determining whether the pet 114 is resting or trying to exit the vehicle 30. If the method 160 determines at decision point 172 that the pet 114 is trying to exit the vehicle 30, then the method 160 may advance to step 176 of opening the upper closure panel 58 and/or the lower closure panel 62 and extending the load ramp 66. Determining that the pet 114 is attempting to exit the vehicle 30 at decision point 172 may be accomplished by referencing one or more imagers provided on the vehicle 30. For example, one or more of the imagers may register movement outside of the vehicle 30 (e.g., an owner/user approaching the vehicle 30), the pet 114 standing for X amount of time, or the pet 114 pawing, scratching, or otherwise interacting with the lower closure panel 62 in a manner that indicates a desire to exit the vehicle 30. If the method 160 determines at decision point 172 that the pet 114 is resting within the vehicle 30, the method 160 may advance to step 180 of controlling a position of the upper closure panel 58. For example, the position of the upper closure panel 58 may be adjusted based on input from a rain sensor and/or a light sensor that provides an indication of the environmental conditions exterior to the vehicle 30, as well as environmental conditions interior to the vehicle 30. For example, if the rain sensor indicates that the environment exterior to the vehicle 30 includes precipitation, then the upper closure panel 58 may be adjusted in its position to prevent rain or precipitation from entering the vehicle 30 and/or negatively affecting the rest of the pet 114. Alternatively, the position of the upper closure panel 58 may be adjusted based upon input from a day/night sensor and/or one or more of the imagers to ensure the area within the vehicle 30 where the pet 114 is located (e.g., the cargo area 46) is covered in shade rather than awash with light from the exterior of the vehicle 30.

Referring again to FIGS. 10A-11, if the method 160 determines at decision point 168 that the pet 114 is not inside of the vehicle 30, then the method 160 may advance to step 184 of activating one or more sensors to determine the presence of the pet 114. For example, the one or more sensors can include the one or more imagers, radar, and the like to determine the presence of the pet 114. If method 160 determines at step 184 that the pet 114 is in close proximity to the vehicle 30 as a result of activating the one or more sensors to detect the pet 114, then the method 160 may advance to decision point 188 of determining if the pet 114 belongs to the owner of the vehicle 30. Decision point 188 may determine that the pet 114 belongs to the owner of the vehicle 30 by referencing data stored within the vehicle 30 (e.g., within a memory of a controller). The data can include, but is not limited to, an RFID tag attached to a collar of the pet 114, a body shape of the pet 114, a body size of the pet 114, and/or any other identifiable trait or information relating to the pet 114. If decision point 188 determines that the pet 114 does not belong to the owner of the vehicle 30, then the method 160 may advance to step 192 where the closure panels 54 remain in the closed position and the load ramp 66 remains in the retracted position. However, if decision point 188 determines that the pet 114 does belong to the owner of the vehicle 30, then the method 160 may advance to step 196 of opening one or more of the closure panels 54 and extending the load ramp 66 to the pet 114.

Figure 15:
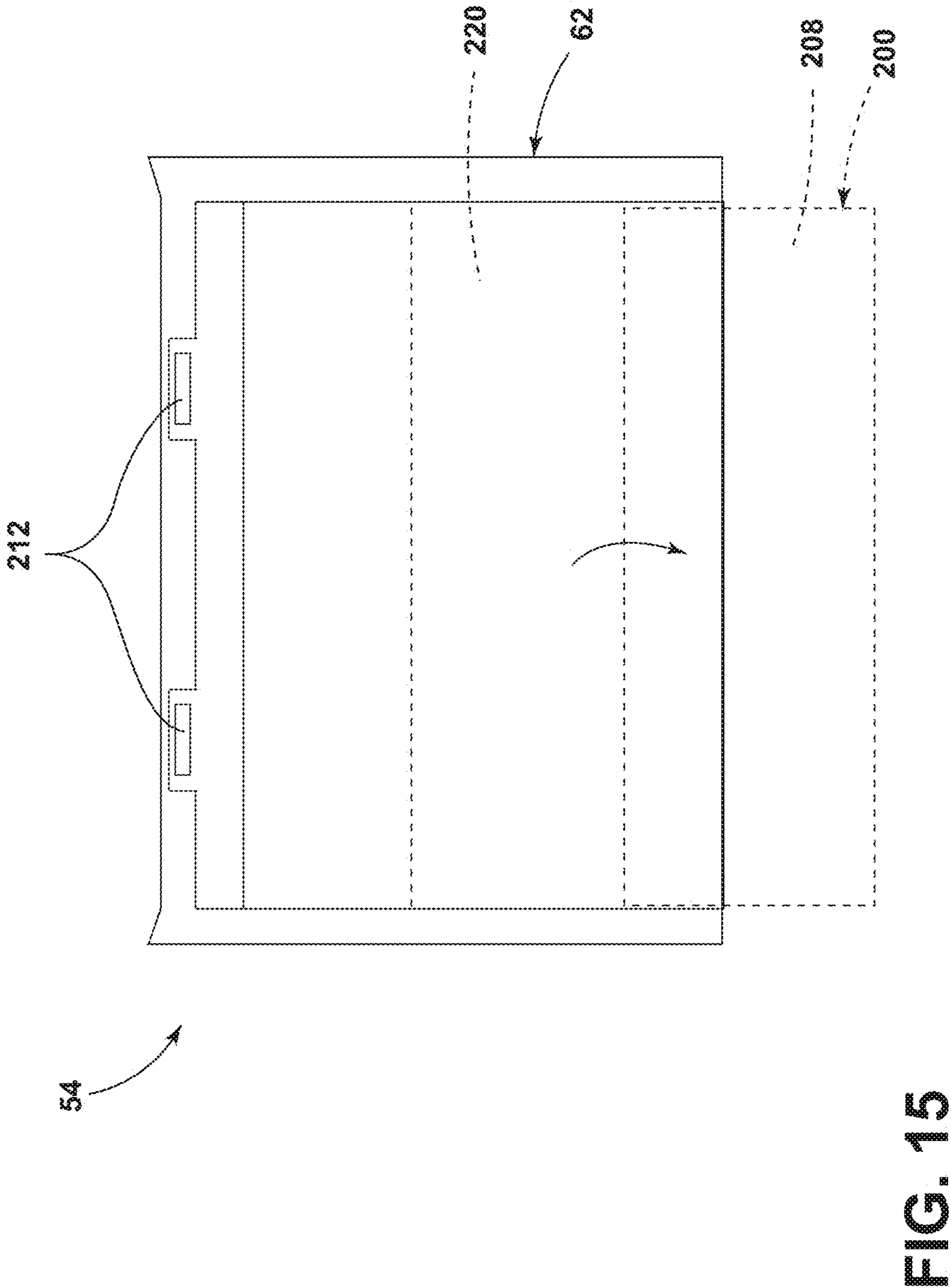
FIG. 15 is a top schematic view of the interaction between the lower closure panel and the interior auxiliary panel, according to one example.
Figure 16:
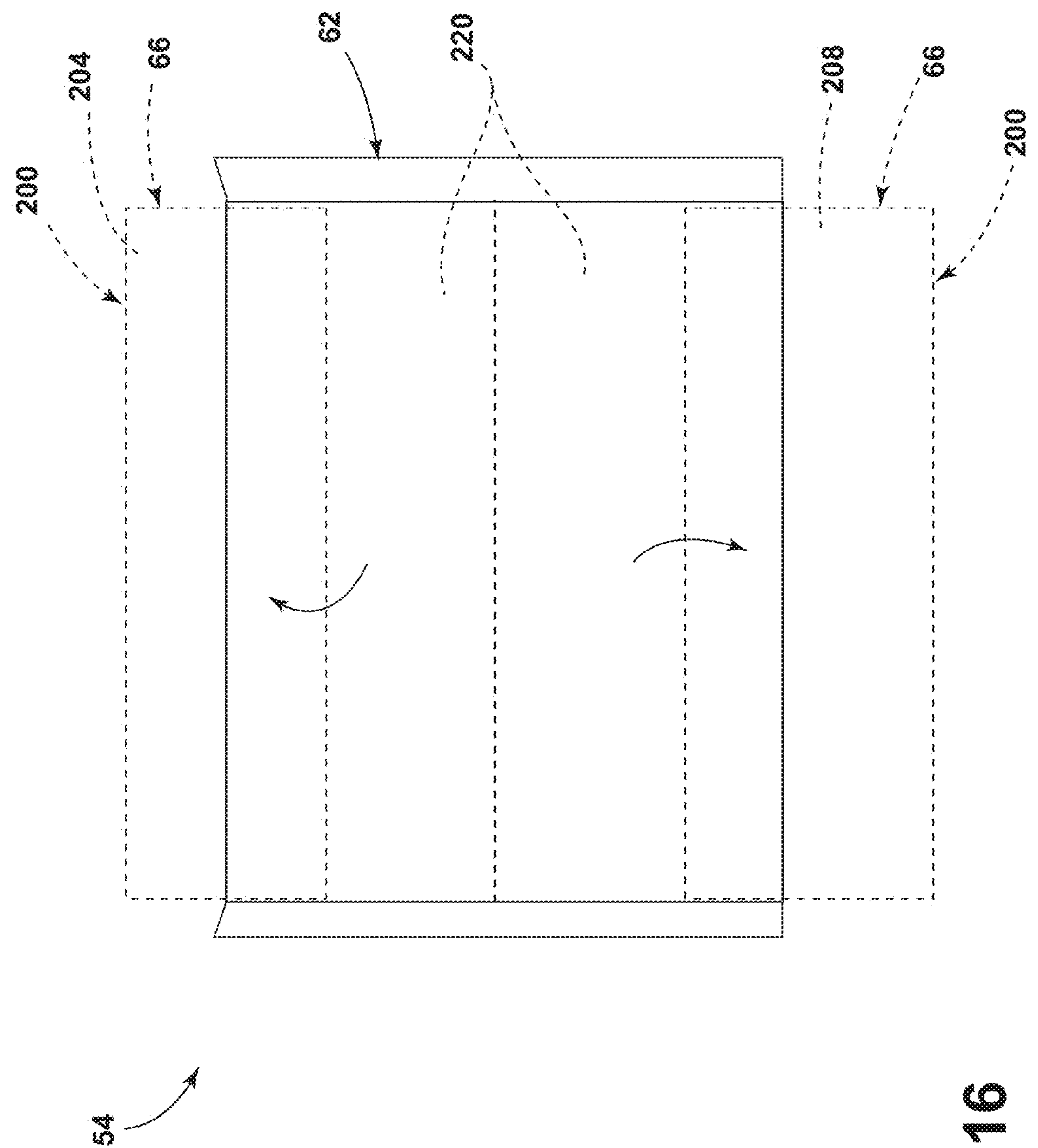
FIG. 16 is a top schematic view of the interaction between the lower closure panel and the exterior and interior auxiliary panels, according to one example.

Referring to FIGS. 12-16, in some examples, the lower closure panel 62 can be provided with one or more auxiliary panels 200. For example, the lower closure panel 62 may be provided with an exterior auxiliary panel 204 and/or an interior auxiliary panel 208. The exterior auxiliary panel 204 can define one or more receptacles 212. In some examples, the one or more receptacles 212 may be defined by the lower closure panel 62 such that the exterior auxiliary panel 204 is omitted (see FIG. 15). The one or more receptacles 212 can each receive a planar member 216. The planar member 216 can extend downwardly and away from the lower closure panel 62 and may contact the support surface 112 upon which the vehicle 30 rests. Alternatively, the planar member 216 may be suspended above the support surface 112 upon which the vehicle 30 rests. The exterior auxiliary panel 204 and/or the planar member 216 may constitute the load ramp 66 in the depicted examples. In the example of FIG. 15 that omits the exterior auxiliary panel 204, the planar member 216 and the lower closure panel 62 may constitute the load ramp 66. In examples that include the interior auxiliary panel 208, the interior auxiliary panel 208 may extend from the lower closure panel 62 into the passenger compartment 42 and/or the cargo area 46. The extension of the interior auxiliary panel 208 from the lower closure panel 62 to the passenger compartment 42 and/or the cargo area 46 may provide a transition surface between the lower closure panel 62 and the passenger compartment 42 and/or the cargo area 46.

Referring again to FIGS. 12-16, the auxiliary panels 200 may be rotatably coupled to the lower closure panel 62 such that the auxiliary panels 200 (e.g., exterior auxiliary panel 204 and/or interior auxiliary panel 208) are movable between a stowed position and a deployed position. In various examples, the lower closure panel 62 may be provided with a recess 220 that corresponds in size and depth to the auxiliary panel(s) 200. Accordingly, when the one or more auxiliary panels 200 are in the stowed position, an interior surface of the lower closure panel 62 may be generally planar. The terms exterior and interior utilized in the exterior auxiliary panel 204 and the interior auxiliary panel 208 can refer to a direction in which the given auxiliary panel 200 extends when in the deployed position relative to the lower closure panel 62 and/or the vehicle 30.

Figure 17:
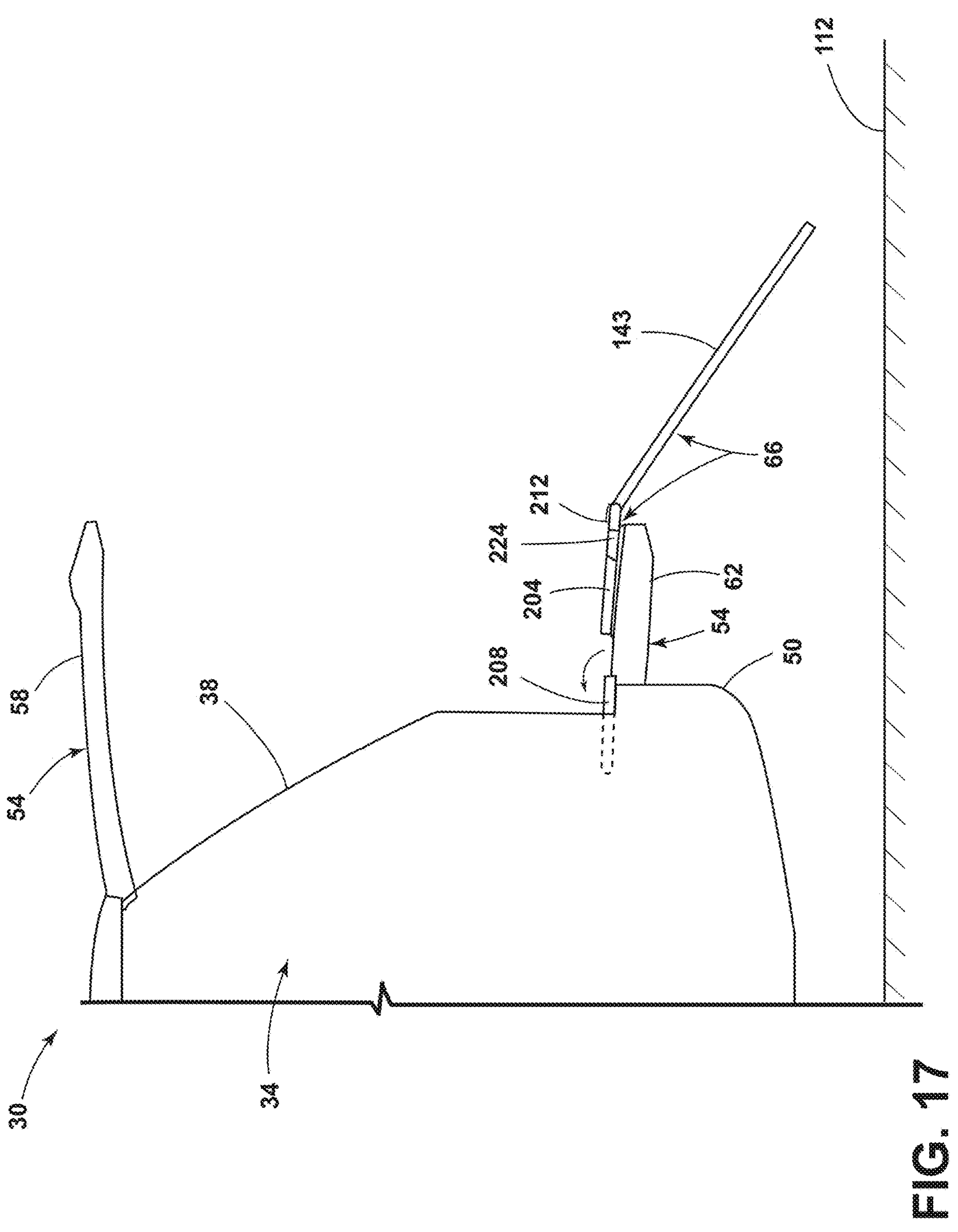
FIG. 17 is a side view of the vehicle, illustrating the exterior auxiliary panel and the interior auxiliary panel coupled to the lower closure panel and each in the deployed position, according to another example.
Figure 18:
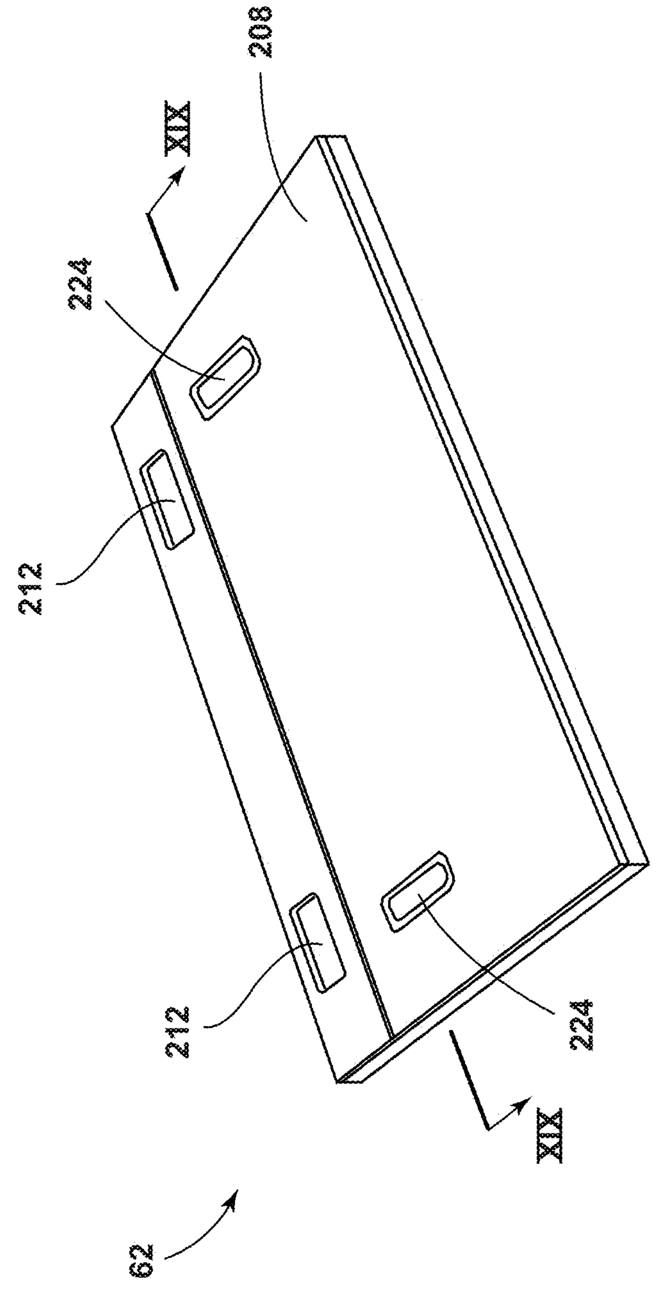
FIG. 18 is a top perspective view of the lower closure panel, illustrating apertures that can be utilized in transitioning the lower closure panel between the stowed position and the deployed position.
Figure 19:
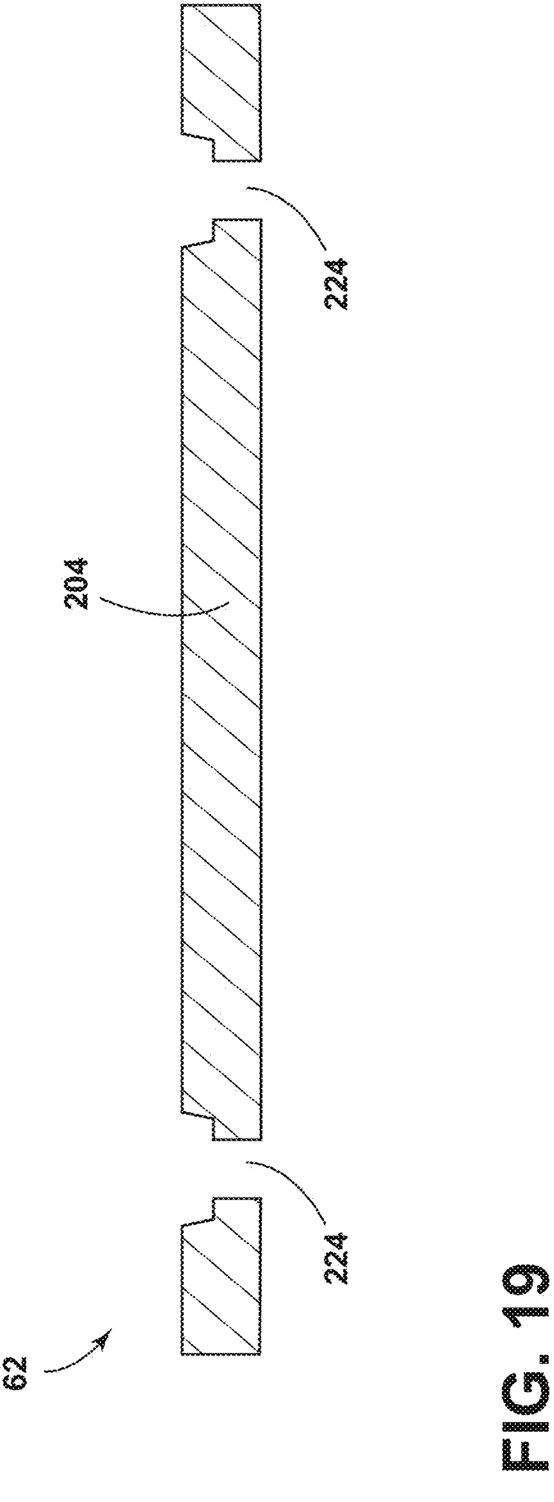
FIG. 19 is a cross-sectional view of the lower closure panel, taken along line XIX-XIX of FIG. 18, according to one example.

Referring to FIGS. 17-19, the vehicle 30 is depicted with the upper and lower closure panels 58, 62 both in the open position. Additionally, the vehicle 30 is depicted with the exterior auxiliary panel 204 and the interior auxiliary panel 208 each in the deployed position. As with the previous examples, the exterior auxiliary panel 204 and/or the lower closure panel 62 can define the receptacles 212 that receive the planar members 216. In the depicted example, the interior auxiliary panel 208 defines one or more actuation apertures 224. The user can utilize the one or more actuation apertures 224 to transition the interior auxiliary panel 208 from the stowed position to the deployed position by reaching a hand into the actuation aperture 224 and applying an upward force to the interior auxiliary panel 208 when the interior auxiliary panel 208 is in the stowed position. In some examples, the one or more actuation apertures 224 may extend through an entirety of the thickness of the interior auxiliary panel 208. The exterior auxiliary panel 204, when employed, may similarly be provided with one or more of the actuation apertures 224 or another suitable structure that aids in deployment from the stowed position to the deployed position.

Figure 20:
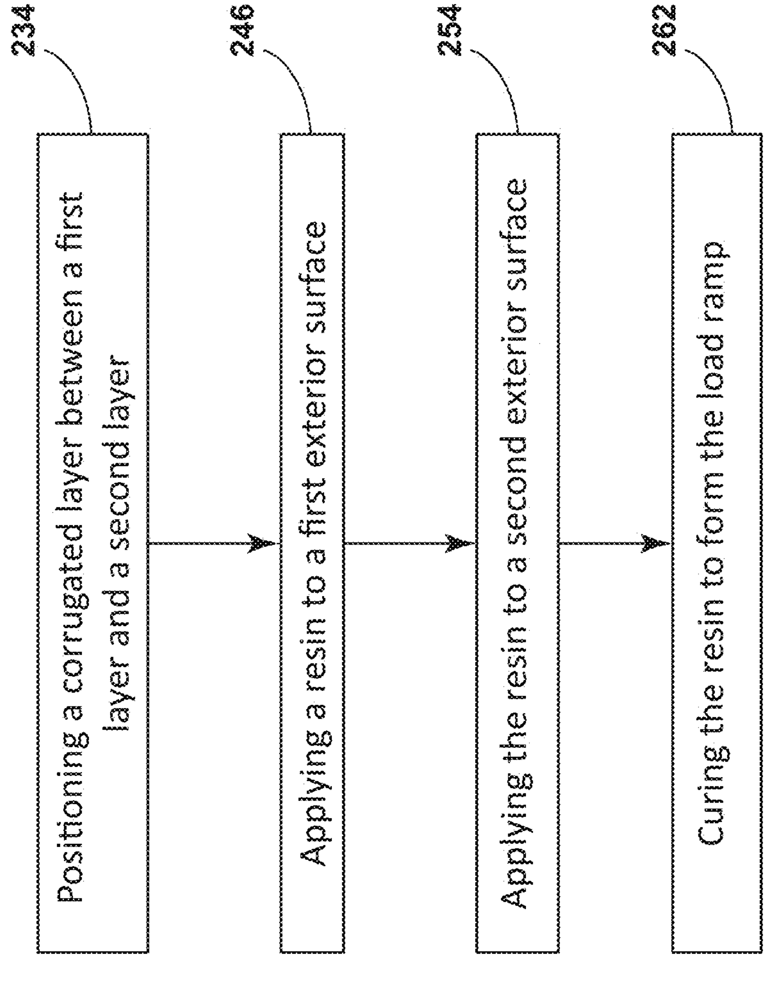
FIG. 20 is a flow diagram of a method of manufacturing the load ramp for the vehicle, according to one example.
Figure 21:
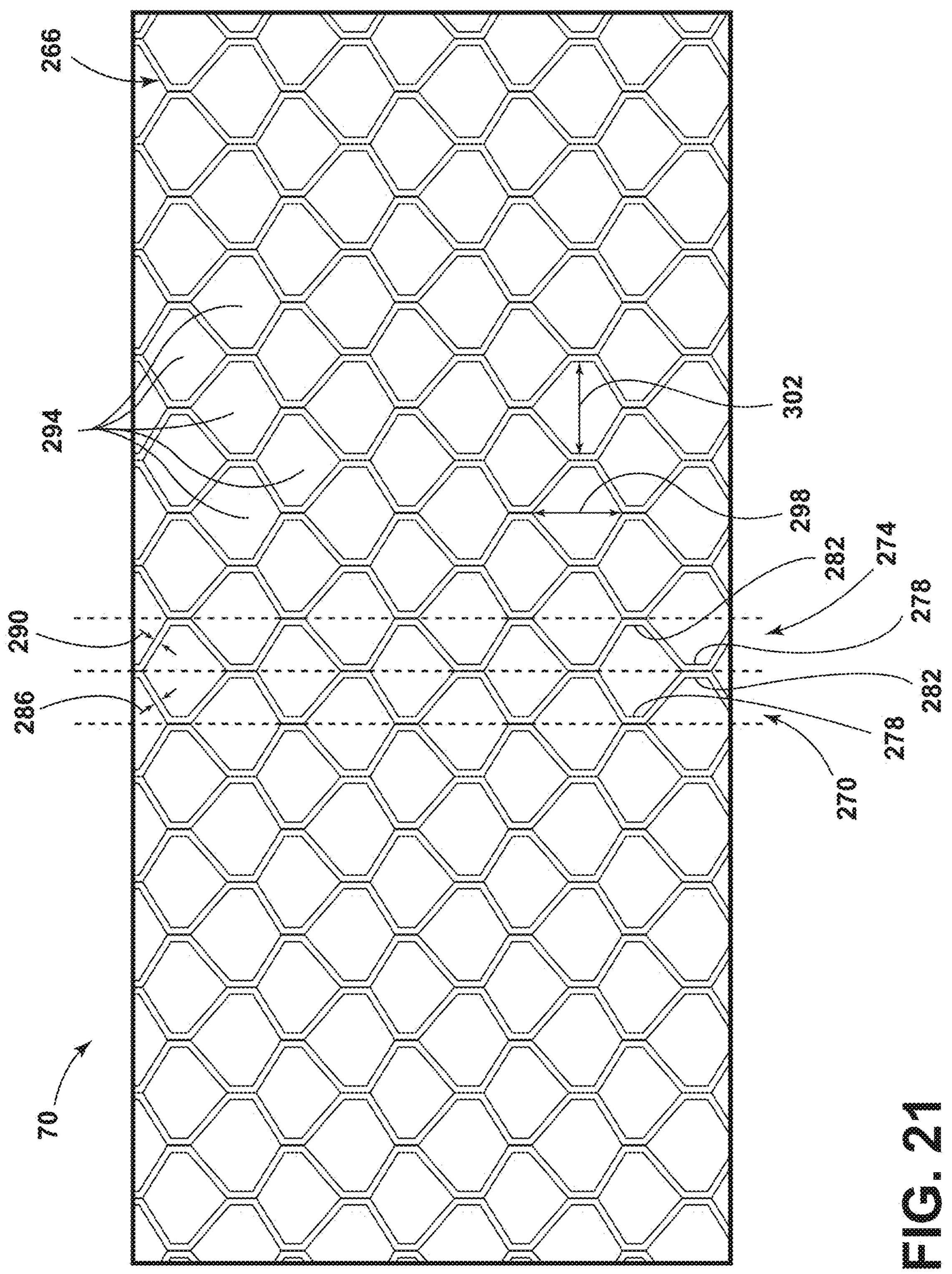
FIG. 21 is a top view of a corrugated layer of the load ramp, illustrating a series of cells, according to one example.
Figure 22:
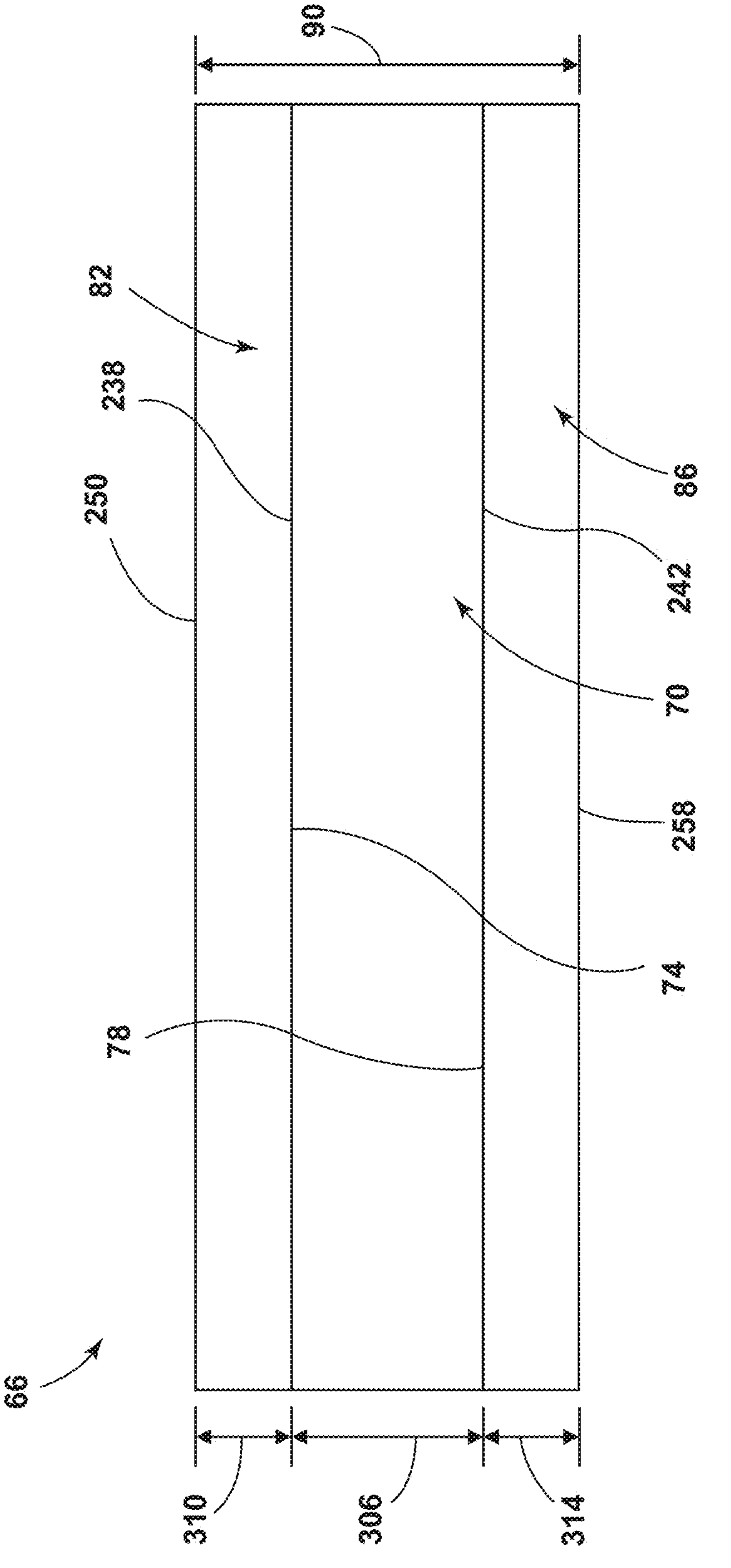
FIG. 22 is a cross-sectional view of the load ramp, taken along line XXII-XXII of FIG. 3, according to one example.

Referring now to FIGS. 20-22, a method 230 of manufacturing the load ramp 66 can include step 234 of positioning the corrugated layer 70 between the first layer 82 and the second layer 86 such that the corrugated layer 70 is in contact with a first interior surface 238 of the first layer 82 and a second interior surface 242 of the second layer 86. Accordingly, the first interior surface 238 of the first layer 82 can be adjacent to the first surface 74 of the corrugated layer 70. Similarly, the second interior surface 242 of the second layer 86 can be adjacent to the second surface 78 of the corrugated layer 70. The method 230 can also include step 246 of applying a resin to a first exterior surface 250 of the first layer 82. In various examples, an amount of the resin that is applied can be sufficient to permeate the first layer 82 such that the resin comes into contact with the corrugated layer 70 (e.g., the first surface 74). Similarly, the method 230 can include step 254 of applying the resin to a second exterior surface 258 of the second layer 86. As with the application of the resin to the first layer 82, an amount of the resin applied to the second layer 86 can be sufficient to permeate the second layer 86 such that the resin comes into contact with the corrugated layer 70 (e.g., the second surface 78). The method 230 can further include step 262 of curing the resin to form the load ramp 66 for the vehicle 30. In various examples, the method 230 can also include a step where excess material is trimmed from the load ramp 66 (e.g., trimmed from a perimeter). The method 230 may also include a step of molding one or more structures into the load ramp 66 (e.g., the receptacles 212, the actuation apertures 224, etc.).

Referring again to FIGS. 20-22, the step 262 of curing the resin to form the load ramp 66 for the vehicle 30 can include heating the first layer 82, the corrugated layer 70, and the second layer 86 to a temperature in the range of about 150° C. to about 180° C. In some examples, the temperature that the first layer 82, the corrugated layer 70, and the second layer 86 is heated to can be in the range of about 150° C. to about 160° C. In one specific example, the temperature that the first layer 82, the corrugated layer 70, and the second layer 86 is heated to can be 155° C. In various examples, the step 262 of curing the resin to form the load ramp 66 for the vehicle 30 can include exposing the first layer 82, the corrugated layer 70, and the second layer 86 to a pressure in the range of about 100 tons (90.7 metric tons) to about 400 tons (362.9 metric tons). For example, the pressure can be in the range of about 250 tons (226.8 metric tons) to about 350 tons (317.5 metric tons). In one specific example, the pressure can be 300 tons (272.2 metric tons).

Referring further to FIGS. 20-22, the corrugated layer 70 defines a honeycomb structure 266. The honeycomb structure 266 includes a first sheet 270 and a second sheet 274. The first and second sheets 270, 274 are adjacent to one another and each includes ridges 278 and valleys 282. The interaction between the first and second sheets 270, 274 defines a pattern that is repeated throughout the corrugated layer 70 to define the honeycomb structure 266. A thickness 286 of the first sheet 270 and a thickness 290 of the second sheet 274 can each be in the range of about 0.5 mm to about 2.0 mm. For example, the thicknesses 286, 290 can be about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, or about 2.0 mm. The ridges 278 of the first sheet 270 can contact the valleys 282 of the second sheet 274 in an alternating fashion such that a series of cells 294 are defined by the first sheet 270 and the second sheet 274. A length 298 of each cell 294 in the series of cells 294 can be in the range of about 10 mm to about 20 mm. For example, the length 298 of each cell 294 can be about 10 mm, about 11 mm, about 12 mm, about 13 mm, about 14 mm, about 15 mm, about 16 mm, about 17 mm, about 18 mm, about 19 mm, or about 20 mm. A width 302 of each cell 294 in the series of cells 294 can be in the range of about 5 mm to about 15 mm. For example, the width 302 of each cell 294 can be about 5 mm, about 6 mm, about 7 mm, about 8 mm, about 9 mm, about 10 mm, about 11 mm, about 12 mm, about 13 mm, about 14 mm, or about 15 mm. A thickness 306 of the corrugated layer 70 can be in the range of about 5 mm to about 15 mm. For example, the thickness 306 of the corrugated layer 70 can be about 5 mm, about 6 mm, about 7 mm, about 8 mm, about 9 mm, about 10 mm, about 11 mm, about 12 mm, about 13 mm, about 14 mm, or about 15 mm. The thickness 90 of the load ramp 66 can be in the range of about 10 mm to about 30 mm. For example, the thickness 90 of the load ramp 66 can be about 10 mm, about 12 mm, about 14 mm, about 16 mm, about 18 mm, about 20 mm, about 22 mm, about 24 mm, about 26 mm, about 28 mm, or about 30 mm. A thickness 310 of the first layer 82 and a thickness 314 of the second layer 86 can be in the range of about 1 mm to about 10 mm. For example, the thickness 310 of the first layer 82 and the thickness 314 of the second layer 86 can be about 1 mm, about 2 mm, about 3 mm, about 4 mm, about 5 mm, about 6 mm, about 7 mm, about 8 mm, about 9 mm, or about 10 mm. Once finished, a load capacity of the load ramp 66 can be at least about 100 kg. For example, the load capacity of the load ramp 66 can be at least about 100 kg, at least about 150 kg, at least about 200 kg, at least about 250 kg, or at least about 300 kg.

Referring again to FIGS. 20-22, the corrugated layer 70 can be made from a processed cellulose fiber (e.g., a paper product). The first layer 82 and/or the second layer 86 can be made of a variety of fiber-based products. For example, the fiber-based products can include, but are not limited to, fiberglass, basalt fiber, and/or carbon fiber. In various examples, the first layer 82 and the second layer 86 can be made of the same fiber-based product or products. In some examples, the resin utilized can be polyurethane. For example, the resin can be a two-part polyurethane. The resin can tie together individual strands of the fiber-based product (s) of the first and second layers 82, 86, as well as provide desirable surface characteristics for the load ramp 66 (e.g., aesthetic appeal, increased strength, increased stiffness). The use of the resin can also enable providing a grained surface to the load ramp 66. For example, the grained surface may be textured and/or provide an increase to a coefficient of friction for the surface of the load ramp 66. In various examples, the resin may be fully cured in less than one minute. For example, the resin may be fully cured in about thirty seconds. In some examples, a decorative layer may be applied to the surface of the load ramp 66. The decorative layer can be, but is not limited to, a carpet layer, a thermoplastic vulcanisate (TPV) layer, a vinyl layer, or the like.

Figure 6:
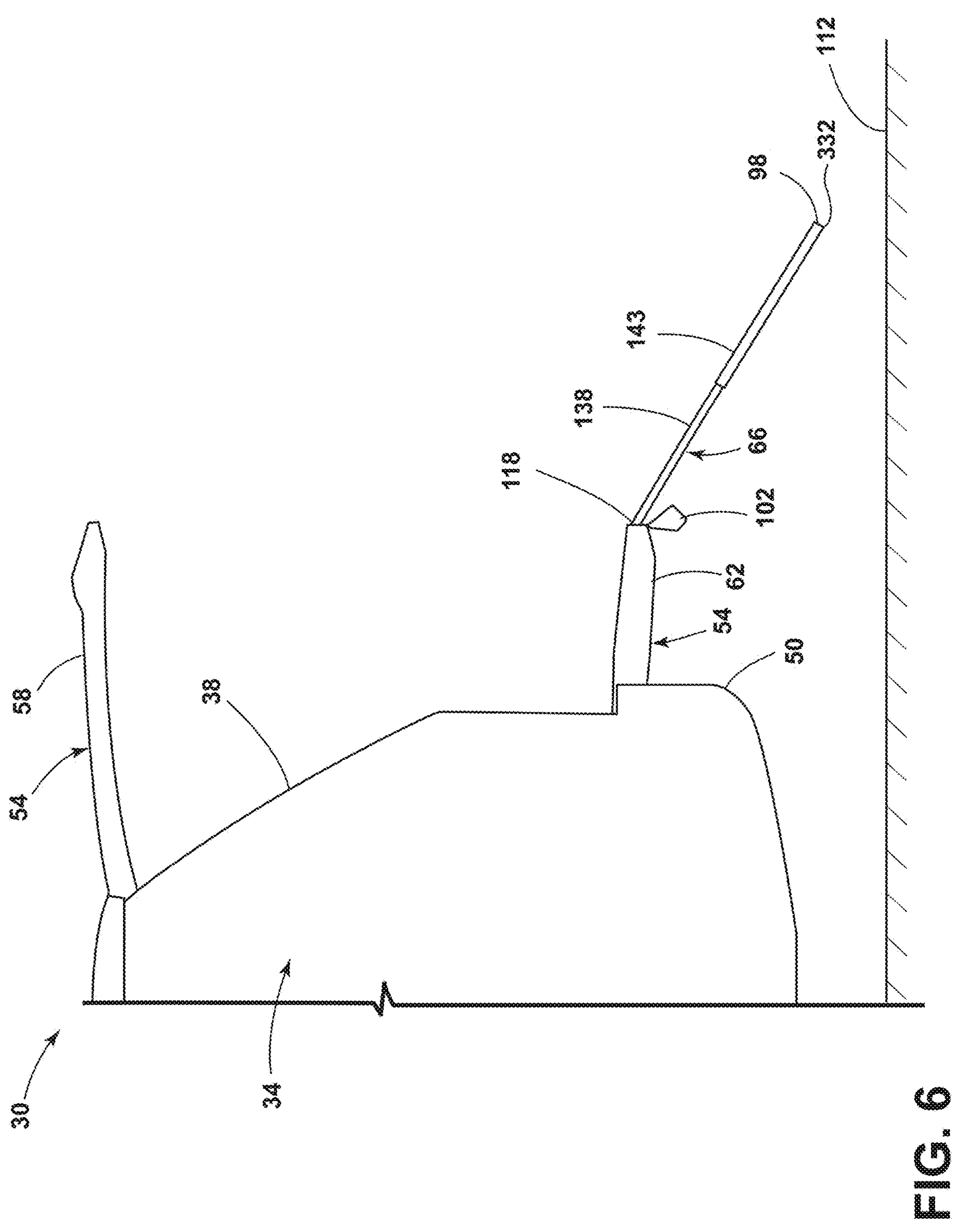
FIG. 6 is a side view of the rear of the vehicle, illustrating the load ramp in the extended position, according to another example.
Figure 7:
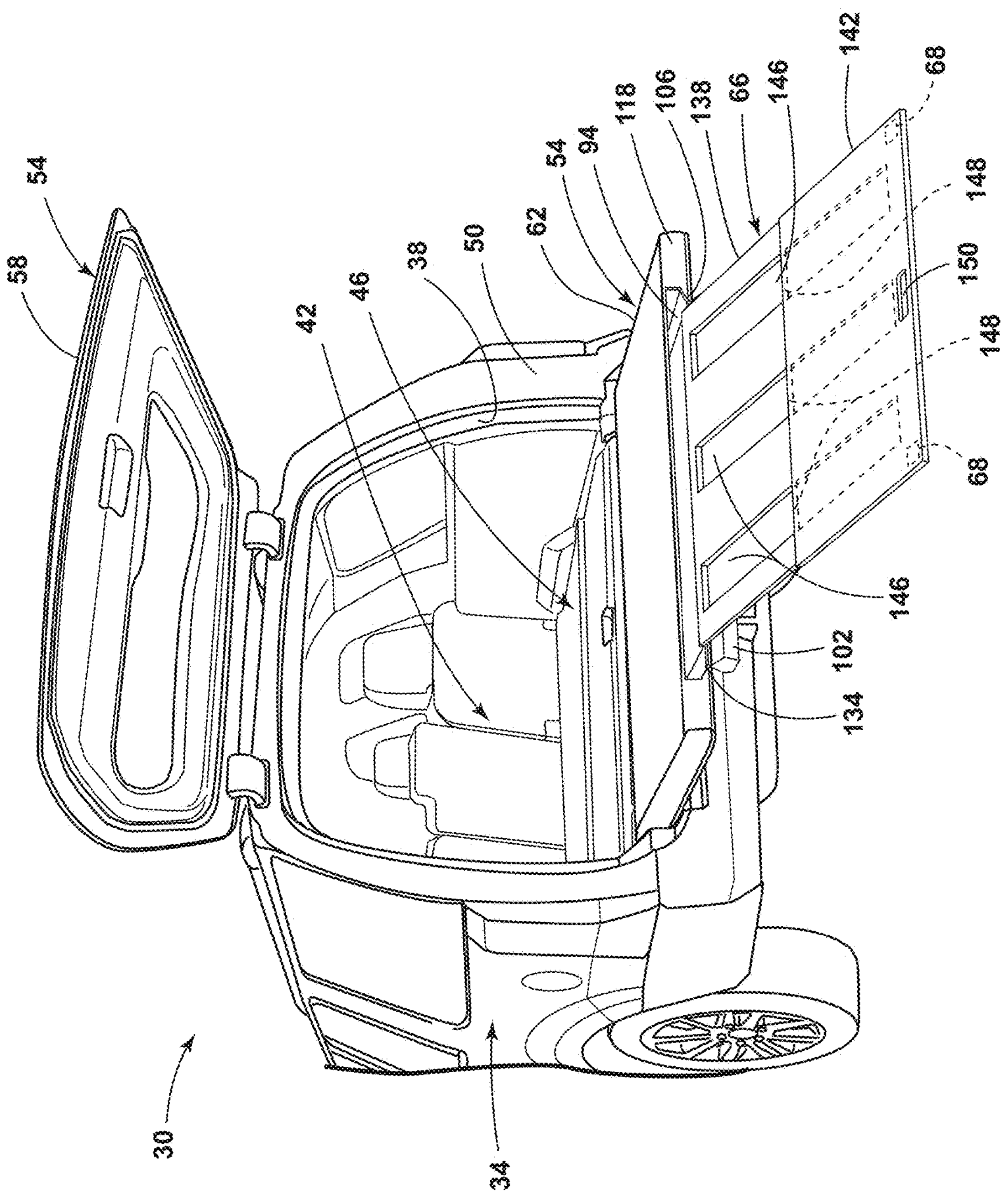
FIG. 7 is a rear perspective view of the vehicle, illustrating the load ramp of FIG. 6 in the extended position, according to one example.
Figure 8:
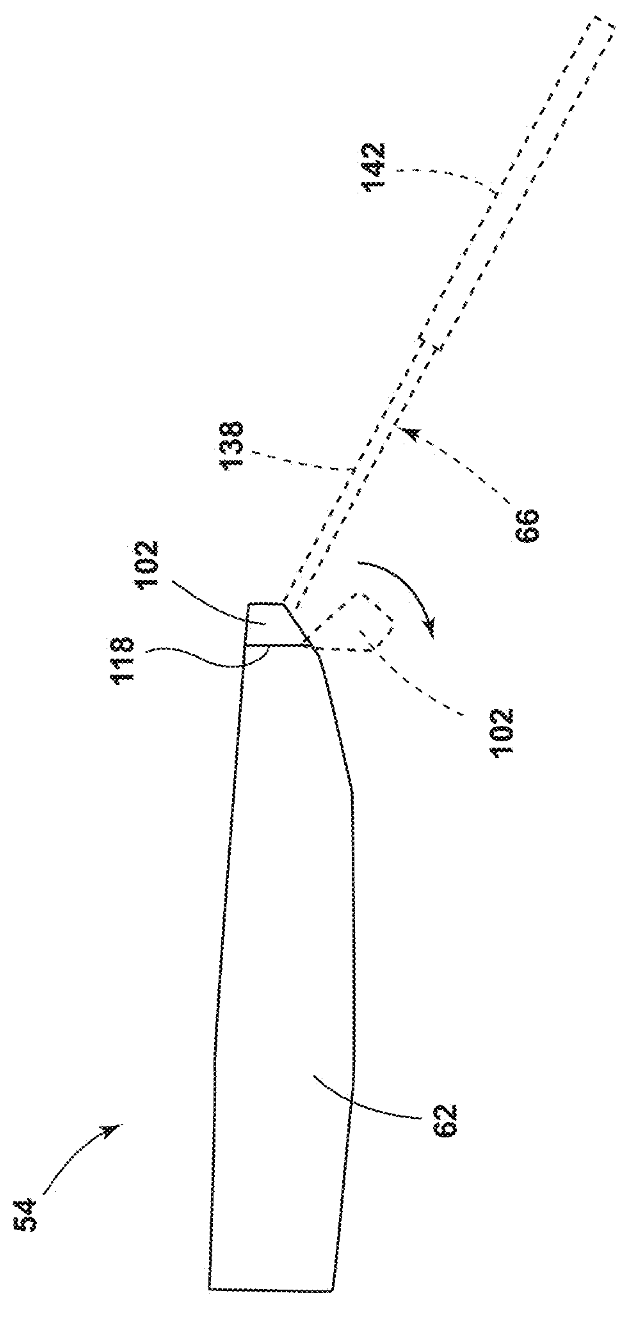
FIG. 8 is a side view of the lower closure panel, illustrating the load ramp in a retracted position with the extended position depicted in dashed lines, according to one example.
Figure 9:
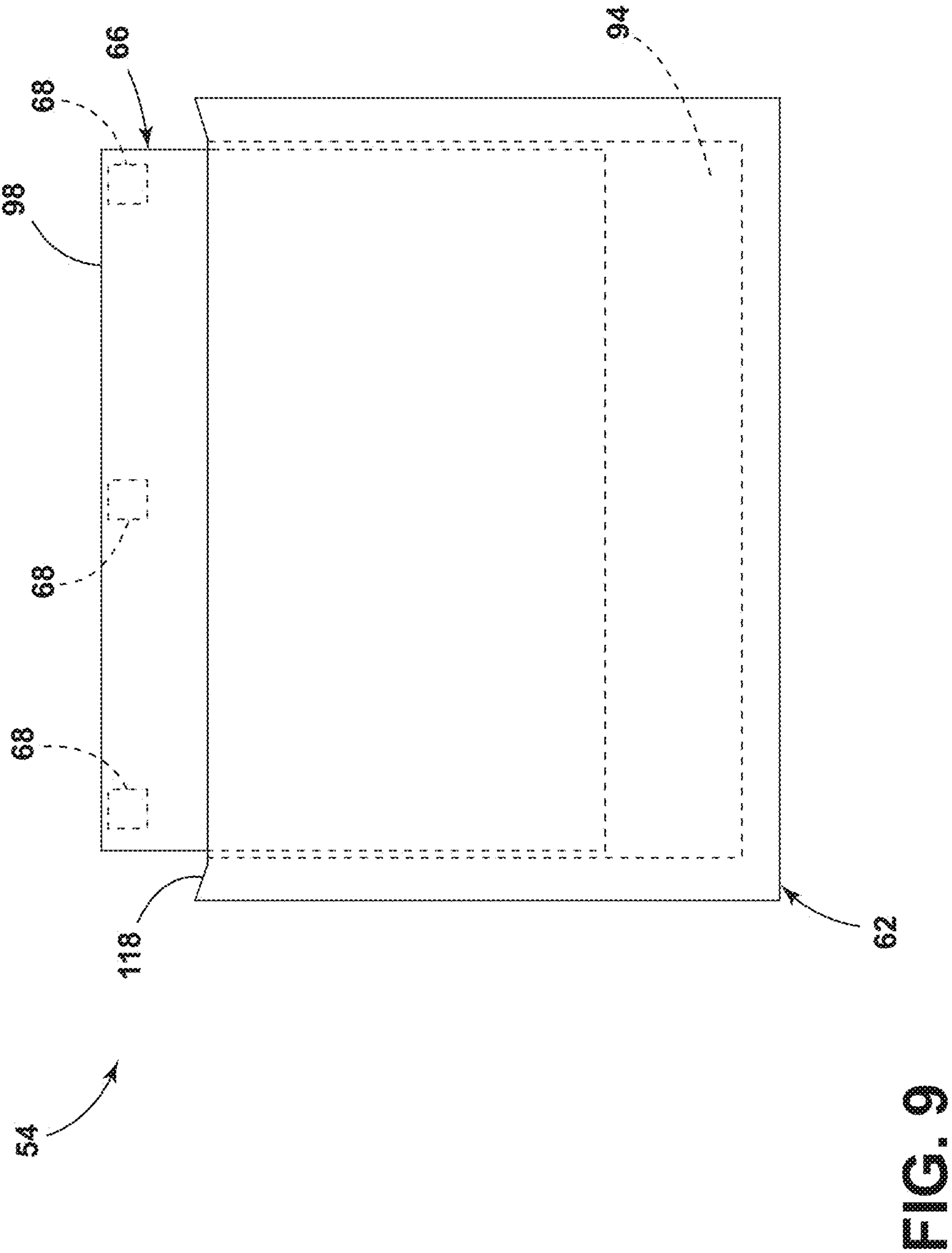
FIG. 9 is a top schematic view of the interaction between the lower closure panel and the load ramp, according to another example.

With reference to FIGS. 1-22, the vehicle 30 can be provided with a motor that actuates the one or more closure panels 54 between the open position and the closed position. For example, as depicted in FIGS. 1 and 2, the upper closure panel 58 can be provided with a first motor 320 and the lower closure panel 62 can be provided with a second motor 324. In some examples, the load ramp 66 may be provided with a heating element 328. In such an example, as depicted in FIGS. 3 and 5, the heating element 328 may be positioned proximate to the free end 98 of the load ramp 66. The heating element 328 may have a length that generally corresponds with a width of the free end 98 (see FIG. 3). Alternatively, the load ramp 66 may be provided with a plurality of the heating elements 328 positioned in spaced relationship to one another along the width of the free end 98 (see FIG. 5). In various examples, as depicted in FIGS. 3 and 6, the heating element(s) 328 can be positioned along a bottom edge 332 of the load ramp 66. By so positioning the heating element(s) 328, the bottom edge 332 may increase in temperature more rapidly. The heating element(s) 328 can aid in melting ice that may have formed around the free end 98 and/or evaporating water that has appeared on the free end 98. For example, if the free end 98 contacts ice on the ground, local melting of the ice may occur upon initial contact with the free end 98 due to the load ramp 66 having been stored in an environment that is warmer than the surrounding, or ambient, weather conditions (e.g., a heated vehicle). In such an example, the melted ice may refreeze as the temperature of the free end 98 decreases due to exposure to the surrounding, or ambient, weather conditions. In such an event, the heating element(s) 328 can aid in liberating the free end 98 from the ice, prevent damage to the load ramp 66, and/or permit stowage of the load ramp 66. In various examples, the free end 98 may be tapered such that a thickness or a height of the free end 98 may decrease as a distance from the coupled end 110 increases. In such an example, liberating the load ramp 66 from ice may involve less effort (e.g., simple actuation toward the retracted position or driving forward with the vehicle 30). In some examples, the closure panel 54 that the load ramp 66 is coupled to (e.g., the lower closure panel 62) may be provided with one or more drainage channels that are positioned along, for example, the coupled edge 122. These drainage channel(s) can allow liquids introduced into the closure panel 54 (e.g., from the load ramp 66) to exit the closure panel 54 when the closure panel 54 is in the closed position. The heating element(s) 328 may be activated when the load ramp 66 is in the retracted position and/or the extended position when moisture is sensed (e.g., by the moisture sensor 68) in an effort to encourage evaporation and/or prevent at least some liquid from being introduced into the closure panel 54 upon stowage of the load ramp 66. As discussed above, the vehicle 30 should remain in a parked state (e.g., transmission in park) any time the load ramp 66 is in the extended position. However, the vehicle 30 may be provided with the capability, as discussed herein, to sense a current position of the load ramp 66 and notify the user of an improper use of the vehicle 30 if the load ramp 30 is extended and the vehicle 30 is placed in motion.

Figure 23:
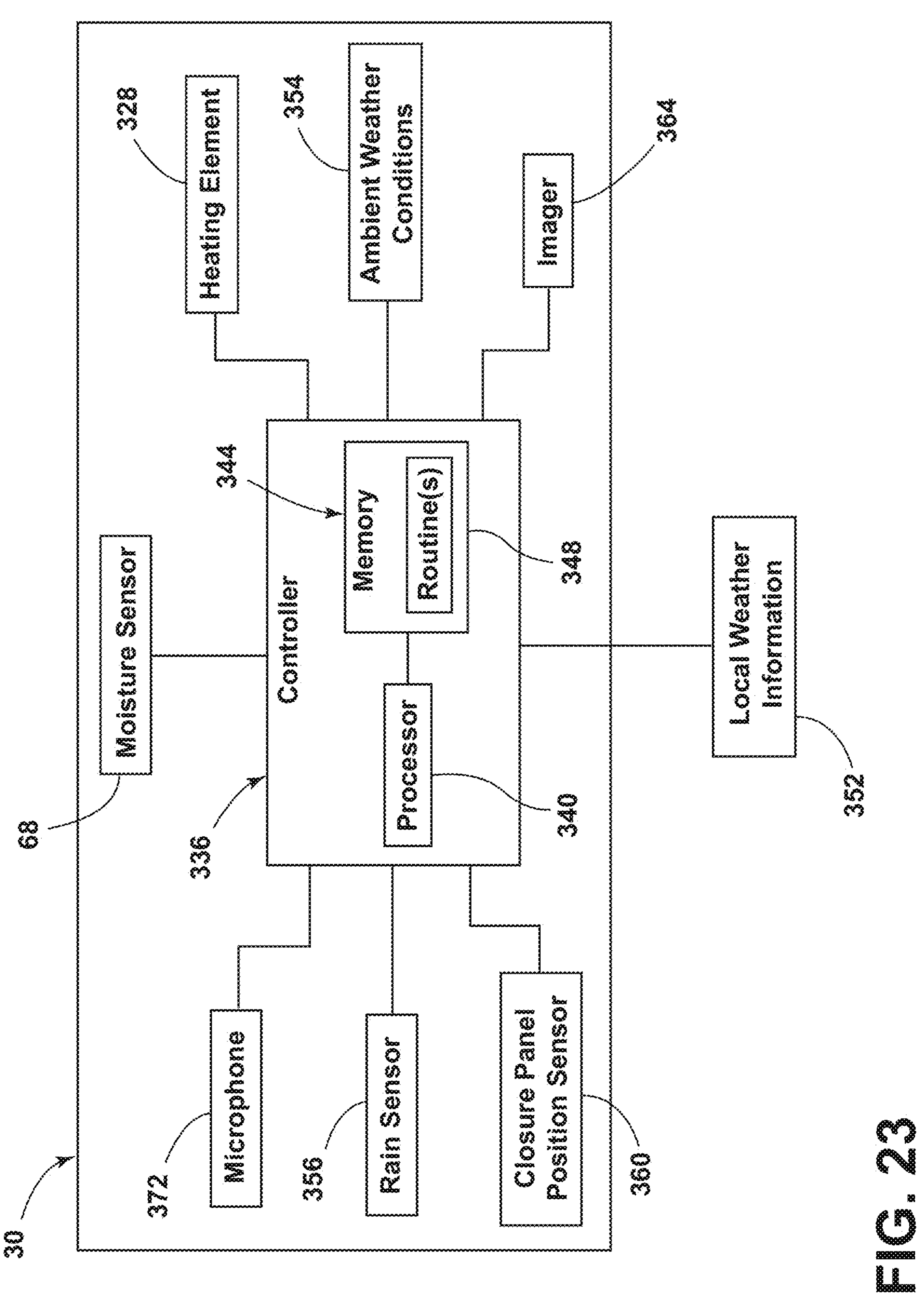
FIG. 23 is a schematic view of the vehicle, illustrating a controller and various components in communication with the controller, according to one example.

Referring to FIG. 23, the vehicle 30 is shown as a schematic representation. The vehicle 30 can include a controller 336 that includes a processor 340 and memory 344. The memory 344 stores one or more programmed software routines 348 that are executable by the processor 340. The software routines 348 can be utilized by the processor 340 to process signals and inputs from the vehicle 30 (e.g., a position of the closure panel(s) 54, input from the moisture sensor 68, a speed of the vehicle 30, a directionality of movement of the vehicle 30, weather conditions, and so on). The controller 336 may include analog and/or digital circuitry such as in the form of the processor 340, according to one example. The controller 336 is communicatively coupled to a user interface. In some examples, the user interface may be positioned on-board the vehicle 30 such that when the vehicle 30 changes a geographical location, the user interface maintains the same geographical location as the vehicle 30 (e.g., an infotainment system human-machine-interface). Additionally, or alternatively, the user interface may be provided as a component that is separate from the vehicle 30 and may be external to the vehicle 30. For example, the user interface may be a mobile electronic device (e.g., a user's personal smart phone, a user's personal computing device, a designated kiosk, and so on). In examples where the user interface is provided both on-board the vehicle 30 and as a separate component of the vehicle 30 (e.g., the user's personal smart phone), the controller 336 may be accessed by either of the user interfaces such that a current user of the vehicle 30 may adjust and/or monitor the various components in communication with the controller 336 while the current user is occupying the vehicle 30 without being limited to needing to be within arm's reach of the on-board user interface. Providing the user interface on-board the vehicle 30, as well as providing the capability for the user interface to be an external component to the vehicle 30, may provide a degree of redundancy for users that enables greater access to users. For example, users that have access to one of the user interfaces that are external to the vehicle 30 can be provided with the freedom to adjust the components of the vehicle 30 that are communicatively coupled to the controller 336 without currently occupying the vehicle 30.

Referring again to FIG. 23, the controller 336 can receive local weather information 352 and/or current ambient weather conditions 354, for example, from a user mobile device (e.g., smart phone), via vehicle-based communication connections (e.g., on-board data connection, on-board cloud accessibility, on-board telecommunications connection, etc.). The local weather information 352 may be received in the form of a local weather report (e.g., a weather forecast). The controller 336 can monitor the local weather information 352 and/or the current ambient weather conditions 354. In some examples, the current ambient weather conditions 354 (i.e., conditions directly outside of the vehicle 30) may be monitored and/or acquired by vehicle-mounted sensors (e.g., an external thermocouple, rain sensor 356, etc.). By way of example, and not limitation, if the controller 336 determines that precipitation (e.g., rain or snow) is forecast in the local weather information 352 (e.g., the local weather report) or if the controller 336 determines that the current ambient weather conditions 354 will decrease from an above-freezing temperature (e.g., above 0° C.) to a below-freezing temperature (e.g., below 0° C.), then the controller 336 may prevent deployment of the load ramp 66. By preventing deployment of the load ramp 66 in such conditions, the possibility of introducing liquid into the closure panel 54 may be decreased. Similarly, by preventing deployment of the load ramp 66 in such conditions, the possibility of the free end 98 of the load ramp 66 becoming frozen in a volume of water (e.g., puddle or ice patch) may be decreased.

Referring further to FIG. 23, in various examples, the vehicle 30 can be provided with an ability to sense a position of the closure panel(s) 54. For example, a current of the first motor 320 and/or a current of the second motor 324 may be monitored, ultrasound sensors may be positioned at the rear 50 of the vehicle 30 (e.g., parking sensors), one or more closure panel position sensors 360 can be provided, and/or an imager 364 (e.g., a camera) may be positioned with a field-of-view toward the access aperture 38, the cargo area 46, and/or the closure panel(s) 54. The imager 364, when employed, may be positioned in a rear of a headrest 368 of a rearward-most seating assembly, in a headliner or roof of the vehicle 30, and/or on the upper closure panel 58 (see FIG. 3). When the current of the first motor 320 and/or the current of the second motor 324 is monitored, such monitoring may be relative to a predetermined current threshold. The predetermined current threshold may correspond to adjusting a position of the closure panel 54 (e.g., the lower closure panel 62) while the load ramp 66 is in the retracted position. Accordingly, if the monitored current of, for example, the second motor 324 exceeds the predetermined threshold, then the controller 336 may determine that the load ramp 66 is in, or is likely to be in, the extended position. The increase in the monitored current can be caused by an increase to a lever arm for the lower closure panel 62 due to the load ramp 66, and its associated weight, being positioned further from a point of rotation of the lower closure panel 62. Said another way, the second motor 324 is likely to experience a greater resistance to movement from the lower closure panel 62 when the load ramp 66 is in the extended position than when the load ramp 66 is in the retracted position. This increased resistance to movement can cause an increase in the current involved with operating the second motor 324. In some examples, the second motor 324 may be provided with a torque feedback that can be employed in deducing whether the load ramp 66 is in the extended position or not when the second motor 324 attempts to place the lower closure panel 62 in the closed position. The torque associated with placing the lower closure panel 62 in the closed position can increase when the load ramp 66 is in the extended position as compared to when the load ramp 66 is in the retracted position. As discussed above, the vehicle 30 should remain in a parked state (e.g., transmission in park) any time the load ramp 66 is in the extended position. However, the vehicle 30 may be provided with the capability, as discussed herein, to sense a current position of the load ramp 66 and notify the user of an improper use of the vehicle 30 if the load ramp 30 is extended and the vehicle 30 is placed in motion.

Referring still further to FIG. 23, the vehicle 30 can include a microphone 372. The microphone 372 may be part of a telecommunications system for the vehicle 30 (e.g., used for communicating during a phone call) or as an input for communicating instructions to the controller 336 (e.g., saying "deploy load ramp"). Alternatively, the microphone 372 may be separate from a telecommunications system and/or separate from being an input for communicating instructions to the controller 336. For example, the microphone 372 may be positioned toward the rear 50 of the vehicle 30 (e.g., in the cargo area 46) and configured to sense sound from a region proximate to the rear 50 of the vehicle 30. The controller 336 may process sound detected or sensed by the microphone 372. In one specific example, the controller 336 may process sound received from the microphone 372 to determine if the sound received from the microphone 372 may be a scraping sound (e.g., the load ramp 66 dragging on the ground or contacting an obstruction). Accordingly, the controller 336 may be equipped with the ability to execute protective measures to prevent damage to the load ramp 66 and/or other components of the vehicle 30. For example, the software routines 348 can include protective measures that are intended to prevent damage to the load ramp 66 and/or other components of the vehicle 30.

Referring again to FIG. 23, the controller 336 can monitor the position of the closure panel 54 (e.g., the lower closure panel 62) and the speed of the vehicle 30 when evaluating sound detected by the microphone 372. In such an example, if the controller 336 determines that the closure panel 54 is in the open position, the vehicle 30 is in motion, and a scraping sound correlates proportionally with the speed of the vehicle 30, then the controller 336 can indicate to a user that the load ramp 66 is, or is likely to be, in the extended position and that the load ramp 66 should be placed in the retracted position. In some examples, the microphone 372 may be the sole sensor or indicator that monitors whether the load ramp 66 is in the retracted position or the extended position.

Figure 24:
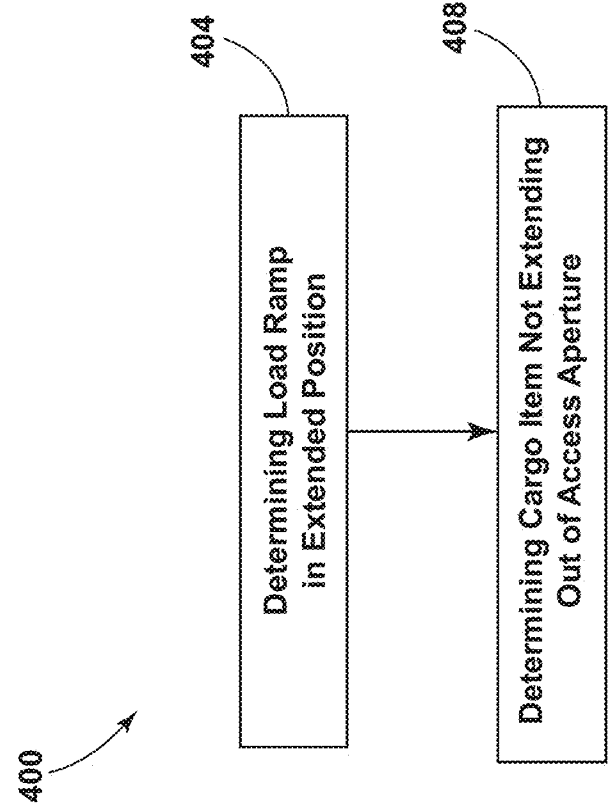
FIG. 24 is a flow diagram illustrating a method of controlling a vehicle, according to one example.

Referring now to FIG. 24, a method 400 of controlling the vehicle 30, or components thereof, is shown according to one example. The method 400 may be executed by the controller 336. The method 400 includes step 404 of determining that the load ramp 66 is in the extended position. The method 400 also includes step 408 of determining that a cargo item is not extending out of the access aperture 38 of the vehicle 30. The access aperture 38 is proximate to the load ramp 66. For example, the access aperture 38 may be the nearest access point to the load ramp 66 for gaining access to the passenger compartment 42 and/or the cargo area 46. The controller 336 may determine the position of the load ramp 66 by any of the approaches, or any combination of the approaches, discussed herein. In one specific example, the step 404 of determining that the load ramp 66 is in the extended position can include monitoring the current of the motor that is responsible for actuating the closure panel 54 that the load ramp 66 is coupled to between the open position and the closed position. For example, the current of the second motor 324 may be monitored in examples where the load ramp 66 is coupled to the lower closure panel 62. In examples where the current of the motor is monitored, the method 400 can also include activating the motor (e.g., the second motor 324) to actuate the closure panel 54 (e.g., the lower closure panel 62) to the closed position. As the closure panel 54 is actuated to the closed position by the motor, the method 400 may execute a step of determining that the load ramp 66 is in the extended position when the current of the motor exceeds the predetermined current threshold discussed above. As discussed above, the vehicle 30 should remain in a parked state (e.g., transmission in park) any time the load ramp 66 is in the extended position. However, the vehicle 30 may be provided with the capability, as discussed herein, to sense a current position of the load ramp 66 and notify the user of an improper use of the vehicle 30 if the load ramp 30 is extended and the vehicle 30 is placed in motion.

Referring again to FIG. 24, the method 400 may include a step of determining that a speed of the vehicle 30 is greater than zero. In such an example, the controller 336 may reference any sensor commonly used in the automotive industry for determining speed (e.g., wheel speed sensor, Global Positioning System, transmission speed sensor, Hall Effect sensor, Reed switch, etc.). Additionally, in such an example, the step 404 of determining that the load ramp 66 is in the extended position can include a step of processing sound that is detected by the microphone 372. In processing the sound received by the microphone 372 the method 400 may determine, or deduce, that the load ramp 66 is in the extended position when the sound corresponds, or is likely to correspond, with a scraping sound (e.g., referencing a sound profile database). The sound received by the microphone 372 may be processed by the controller 336, where the controller 336 receives a signal from the microphone 372 that is then compared (e.g., by the processor 340) to known sounds stored within the memory 344 (e.g., within a sound profile database). In some examples, the scraping sound, or sound that is likely to be scraping, may be determined to correlate proportionally with the speed of the vehicle 30. For example, a volume and/or a frequency of the sound received by the microphone 372 may correlate with the speed of the vehicle 30. As discussed above, the vehicle 30 should remain in a parked state (e.g., transmission in park) any time the load ramp 66 is in the extended position. However, the vehicle 30 may be provided with the capability, as discussed herein, to sense a current position of the load ramp 66 and notify the user of an improper use of the vehicle 30 if the load ramp 30 is extended and the vehicle 30 is placed in motion.

Referring further to FIG. 24, in some examples, the vehicle 30 may be provided with a tag 412 that is coupled to the load ramp 66 (see FIG. 3). For example, the tag 412 may be positioned in the free end 98 of the load ramp 66. Alternatively, the tag 412 may be positioned in the coupled end 110 of the load ramp 66. In examples where the tag 412 is positioned in the free end 98, a tag sensor 416 (see FIG. 3) may be positioned proximate to the opening 106 of the cavity 94 (e.g., positioned in the free edge 118 of the lower closure panel 62). Accordingly, when the load ramp 66 is in the retracted position, the tag sensor 416 may sense the presence of the tag 412 (e.g., a proximity sensor arrangement) and thereby indicate that the load ramp 66 is in the retracted position. Similarly, when the tag 412 is in the coupled end 110 of the load ramp 66, the tag sensor 416 may be positioned proximate the coupled edge 122 of the lower closure panel 62. Regardless of the particular arrangement of the tag 412 and the tag sensor 416, when the load ramp 66 is in the extended position, the tag 412 may be moved to a position that is out-of-range of the tag sensor 416. In examples that employ the tag 412, regardless of the specific positioning of the tag 412, the step 404 of determining that the load ramp 66 is in the extended position can include a step of sensing a current position of the tag 412 that is coupled to the load ramp 66 relative to a vehicle receiver (e.g., the tag sensor 416). In such an example, the method 400 can also include a step of determining that the load ramp 66 is in the extended position when a distance between the tag 412 and the vehicle receiver exceeds a predetermined distance threshold (e.g., an operating distance of the tag sensor 416).

Referring still further to FIG. 24, in various examples, the vehicle 30 can be provided with a ramp motor 420 (see FIG. 5) that is responsible for actuating the load ramp 66 between the retracted position and the extended position. The ramp motor 420 may be positioned in the lower closure panel 62. In examples that employ the ramp motor 420, the method 400 can include a step of activating the ramp motor 420 such that the load ramp 66 is actuated to the retracted position. In such an example, the method 400 may have already determined that the load ramp 66 is in the extended position. Alternatively, the method 400 may execute the step of activating the ramp motor 420 to actuate the load ramp 66 to the retracted position independent of whether the method 400 has previously established that the load ramp 66 is in the extended position. In such an example, a current of the ramp motor 420 may be monitored. Accordingly, if the method 400 attempts to actuate the load ramp 66 toward the retracted position and the load ramp 66 is already in the retracted position, the current of the ramp motor 420 may increase as the attempted movement of the load ramp 66 meets resistance (e.g., physical impediment to movement). Alternatively, the ramp motor 420 may be a stepper motor that is able to track a current position of the load ramp 66. As discussed above, the vehicle 30 should remain in a parked state (e.g., transmission in park) any time the load ramp 66 is in the extended position. However, the vehicle 30 may be provided with the capability, as discussed herein, to sense a current position of the load ramp 66 and notify the user of an improper use of the vehicle 30 if the load ramp 30 is extended and the vehicle 30 is placed in motion.

Referring yet again to FIG. 24, in various examples, the step 408 of determining that a cargo item is not extending out of the access aperture 38 of the vehicle 30 can include referencing an image captured by a vehicle-mounted camera (e.g., the imager 364). The vehicle-mounted camera can be coupled to the vehicle 30 such that a field-of-view of the vehicle-mounted camera includes the access aperture 38. The vehicle-mounted camera, when employed, may be positioned in a rear of the headrest 368 of the rearward-most seating assembly, in a headliner or roof of the vehicle 30, and/or in the upper closure panel 58 (see FIG. 3). In some examples, the method 400 may include determining that the user of the vehicle 30 has placed the vehicle 30 in reverse or the vehicle 30 is traveling in reverse. For example, the controller 336 may reference a gear that a transmission of the vehicle 30 is currently in or the controller 336 may reference a direction of travel of wheels of the vehicle 30 (e.g., clockwise vs. counterclockwise). In examples where the method 400 determines that the load ramp 66 is in the extended position when the vehicle 30 is placed in reverse, the controller 336 may prevent movement of the vehicle 30 until the load ramp 66 is at least partially retracted from the extended position or fully in the retracted position. Further, if the controller 336 detects that the vehicle 30 is traveling in reverse, the method 400 can include actuating the load ramp 66 to the retracted position. In some examples, the controller 336 may prevent motion of the vehicle 30 in any direction (e.g., forward or reverse) while the load ramp 66 is in the extended position. It is contemplated that traveling in reverse while the load ramp 66 is in the extended position may have the potential of causing greater damage to the load ramp 66, the closure panel 54, and/or other components of the vehicle 30 if the load ramp 66 were to physically contact an impediment (e.g., a curb or other structure). As discussed above, the controller 336 may monitor a local weather report (e.g., the local weather information 352) and the current ambient weather conditions 354. Accordingly, the method 400 can include monitoring the local weather report and the current ambient weather conditions 354 exterior to the vehicle 30. In such an example, the method 400 can also include actuating the load ramp 66 to the retracted position when at least one of the local weather report and the current ambient weather conditions 354 exterior to the vehicle 30 indicate a forecast for a local temperature (i.e., within the vicinity of the vehicle 30) to decrease from an above-freezing temperature (e.g., above 0° C.) to a below-freezing temperature (e.g., below 0° C.).

A variety of solutions are discussed herein that are directed to powered actuation of the load ramp 66 between the retracted position and the extended position. However, the present disclosure also contemplates manual deployment and/or stowing of the load ramp 66 (e.g., requiring user action). In such examples, the user may be notified of an action that should be taken (e.g., stowing the load ramp 66) by way of a notification system (e.g., an on-board human-machine interface, audible notification via a speaker system, a personal mobile device, etc.). It is also contemplated that the closure panel 54 that the load ramp 66 is coupled to may be powered while deployment and/or stowage of the load ramp 66 may be manual or semi-manual. For example, the load ramp 66 may be coupled to the lower closure panel 62 in such a way that actuating the load ramp 66 from the extended position to the retracted position and/or actuating the load ramp 66 from the retracted position to the extended position may be accomplished, at least in part, by relying on gravity acting on the load ramp 66 during actuation of the lower closure panel 62.

In various examples, communication with the user may occur by way of a human-machine interface provided with the vehicle 30 (e.g., a screen located in a dashboard and/or an instrument panel of the vehicle 30). The sensors and/or data sources discussed in the present disclosure are not intended to be limiting. Rather, the sensors and/or data sources are intended to convey illustrative examples of the types of components that may be monitored and/or controlled in executing the functionality of the vehicle 30 disclosed herein. The vehicle 30 should remain in a parked state (e.g., transmission in park) any time the load ramp 66 is in the extended position. However, the vehicle 30 may be provided with the capability, as discussed herein, to sense a current position of the load ramp 66 and notify the user of an improper use of the vehicle 30 if the load ramp 30 is extended and the vehicle 30 is placed in motion.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A method of controlling a vehicle, the method comprising:
- actuating via a motor a load ramp that is proximate to an access aperture on the vehicle between a retracted position and an extended position;
- determining via a controller that the load ramp is in an extended position;
- determining via the controller that a cargo item is not extending out of the access aperture of the vehicle, including referencing an image captured by a vehicle-mounted camera, wherein the vehicle-mounted camera is coupled to the vehicle such that a field-of-view of the camera includes the access aperture;
- sensing moisture with a moisture sensor positioned proximate to a free end of the load ramp; and
- activating a heating element via the controller to heat the load ramp based on the sensed moisture.

2. The method of claim 1, wherein the step of determining that a load ramp is in an extended position comprises:
- monitoring via the controller a current of a motor that actuates a closure panel between an open position and a closed position, wherein the closure panel selectively covers at least a portion of the access aperture, and wherein the load ramp is deployably coupled to the closure panel;
- activating via the controller the motor to actuate the closure panel to the closed position; and
- determining via the controller that the load ramp is in the extended position when the current of the motor exceeds a predetermined current threshold.

3. The method of claim 1, further comprising:
determining via the controller that a speed of the vehicle is greater than zero.

4. The method of claim 3, wherein the step of determining that a load ramp is in an extended position comprises:
processing sound that is detected by a microphone, wherein the microphone is attached to the vehicle; and
determining via the controller that the load ramp is in the extended position when a scraping sound is detected by the microphone.

5. The method of claim 4, wherein the scraping sound that is detected by the microphone correlates proportionally with the speed of the vehicle.

6. The method of claim 1, wherein the step of determining that a load ramp is in an extended position comprises:
sensing a current position of a tag that is coupled to the load ramp relative to a vehicle receiver; and
determining via the controller that the load ramp is in the extended position when a distance between the tag and the vehicle receiver exceeds a predetermined distance threshold.

7. The method of claim 1, further comprising:
preventing movement of the vehicle via the controller when the load ramp is in the extended position and a transmission is placed in a position that corresponds with traveling in reverse; and
activating via the controller the motor that actuates the load ramp between the extended position and a retracted position such that the load ramp is actuated toward the retracted position.

8. The method of claim 7, wherein the vehicle-mounted camera is coupled to a roof of the vehicle.

9. The method of claim 1, further comprising:
determining via the controller that the vehicle is traveling in reverse; and
actuating via the controller the load ramp to a retracted position.

10. The method of claim 1, further comprising:
monitoring a local weather report and current ambient weather conditions exterior to the vehicle; and
actuating via the controller the load ramp to a retracted position when at least one of the local weather report and the current ambient weather conditions exterior to the vehicle indicate a forecast for a local temperature to decrease from an above-freezing temperature to a below-freezing temperature.

11. The method of claim 10, wherein the load ramp is coupled to a closure panel on the vehicle.

12. A method of controlling a vehicle, the method comprising:
actuating via a motor a load ramp that is proximate to an access aperture on the vehicle between a retracted position and an extended position, wherein the load ramp is coupled to a closure panel of the vehicle and extends from a cavity in the closure panel of the vehicle when moving between the retracted position and the extended position;
determining via a controller that the load ramp is in an extended position;
determining via the controller that a cargo item is not extending out of the access aperture of the vehicle, including referencing an image captured by a vehicle-mounted camera, wherein the vehicle-mounted camera is coupled to the vehicle such that a field-of-view of the camera includes the access aperture;
preventing movement of the vehicle via the controller when the load ramp is in the extended position and a transmission is placed in a position that corresponds with traveling in reverse;
activating via the controller the motor that actuates the load ramp between the extended position and a retracted position such that the load ramp is actuated toward the retracted position;
sensing moisture with a moisture sensor positioned proximate to a free end of the load ramp; and
activating a heating element via the controller to heat the load ramp based on the sensed moisture.

13. The method of claim 12, wherein the step of determining that a load ramp is in an extended position comprises:
monitoring via the controller a current of a motor that actuates a closure panel between an open position and a closed position, wherein the closure panel selectively covers at least a portion of the access aperture, and wherein the load ramp is deployably coupled to the closure panel;
activating via the controller the motor to actuate the closure panel to the closed position; and
determining via the controller that the load ramp is in the extended position when the current of the motor exceeds a predetermined current threshold.

14. The method of claim 12, further comprising:
determining via the controller that a speed of the vehicle is greater than zero.

15. The method of claim 14, wherein the step of determining that a load ramp is in an extended position comprises:
processing sound that is detected by a microphone, wherein the microphone is attached to the vehicle; and
determining via the controller that the load ramp is in the extended position when a scraping sound is detected by the microphone.

16. The method of claim 15, wherein the scraping sound that is detected by the microphone correlates proportionally with the speed of the vehicle.

17. The method of claim 12, wherein the step of determining that a load ramp is in an extended position comprises:
sensing a current position of a tag that is coupled to the load ramp relative to a vehicle receiver; and
determining via the controller that the load ramp is in the extended position when a distance between the tag and the vehicle receiver exceeds a predetermined distance threshold.

18. The method of claim 17, wherein the vehicle-mounted camera is coupled to a roof of the vehicle.

19. The method of claim 12, further comprising:
determining via the controller that the vehicle is traveling in reverse; and
actuating via the controller the load ramp to a retracted position.

20. The method of claim 12, further comprising:
monitoring a local weather report and current ambient weather conditions exterior to the vehicle; and
actuating via the controller the load ramp to a retracted position when at least one of the local weather report and the current ambient weather conditions exterior to the vehicle indicate a forecast for a local temperature to decrease from an above-freezing temperature to a below-freezing temperature.

* * * * *